(12) United States Patent
Wang et al.

(10) Patent No.: US 11,106,480 B2
(45) Date of Patent: Aug. 31, 2021

(54) SYSTEMS, METHODS, AND APPARATUS TO IMPROVE CONTAINERIZED APPLICATION VISIBILITY

(71) Applicant: VMware, Inc., Palo Alto, CA (US)

(72) Inventors: Bin Wang, Palo Alto, CA (US); Aditi Vutukuri, Santa Clara, CA (US); Lan Luo, Santa Clara, CA (US); Margaret Petrus, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 250 days.

(21) Appl. No.: 16/258,016

(22) Filed: Jan. 25, 2019

(65) Prior Publication Data

US 2020/0241903 A1    Jul. 30, 2020

(51) Int. Cl.
| | |
|---|---|
| *G06F 9/455* | (2018.01) |
| *H04L 29/12* | (2006.01) |
| *H04L 12/24* | (2006.01) |
| *G06F 9/54* | (2006.01) |
| *G06F 9/451* | (2018.01) |
| *H04L 12/26* | (2006.01) |

(52) U.S. Cl.
CPC .......... *G06F 9/45558* (2013.01); *G06F 9/451* (2018.02); *G06F 9/547* (2013.01); *H04L 41/12* (2013.01); *H04L 43/08* (2013.01); *H04L 61/2007* (2013.01); *G06F 2009/45595* (2013.01)

(58) Field of Classification Search
CPC ...... G06F 9/45558; G06F 9/451; G06F 9/547; G06F 2009/45595; H04L 41/12; H04L 43/08; H04L 61/2007

USPC .............................................. 718/1
See application file for complete search history.

(56) References Cited

U.S. PATENT DOCUMENTS

| | | | |
|---|---|---|---|
| 10,698,714 B2* | 6/2020 | Krishnamurthy ... | G06F 9/45558 |
| 2014/0201642 A1* | 7/2014 | Vicat-Blanc ............ | H04L 41/22 715/736 |
| 2015/0378765 A1* | 12/2015 | Singh ........................ | G06F 9/50 718/1 |
| 2015/0381711 A1* | 12/2015 | Singh .................. | H04L 41/0816 709/221 |
| 2018/0183764 A1* | 6/2018 | Gunda ..................... | G06F 9/06 |
| 2020/0364074 A1* | 11/2020 | Gunda .................... | G06F 21/57 |

* cited by examiner

*Primary Examiner* — Bradley A Teets
(74) *Attorney, Agent, or Firm* — Hanley, Flight & Zimmerman, LLC

(57) ABSTRACT

Methods, apparatus, systems, and articles of manufacture are disclosed to improve containerized application visibility. An example apparatus includes a container application manager to build an inventory of the containerized application, the containerized application including a virtual machine, the virtual machine hosting one or more containers, and a network topology builder to invoke a virtual machine agent of the virtual machine to obtain network traffic events from the one or more containers to generate network topology information associated with the containerized application based on the inventory, generate a network topology for the containerized application based on the network topology information, build the visualization based on the network topology, the visualization including the inventory and the network topology information, and launch a user interface to display the visualization to execute one or more computing tasks.

21 Claims, 16 Drawing Sheets

| CONTAINER ORCHESTRATION MANAGER (COM) — 130 | NETWORK POLICY CONTROLLER — 156 | NETWORK CONTROLLER — 182 |
|---|---|---|
| CLUSTER | DOMAIN | |
| | PROVIDER | T0 LOGICAL ROUTER |
| | NETWORK | T1 LOGICAL ROUTER |
| | IP POOL | |
| NAMESPACE | DOMAIN | |
| | SEGMENT | LOGICAL SWITCH |
| POD | CONTAINER SET | |
| | LOGICAL PORT | LOGICAL PORT |
| SERVICE | APPLICATION SERVICE | |
| | APPLICATION (A SET OF SERVICES) | |
| NETWORK POLICY | COMMUNICATION GROUP | DFW (DFW RULES) |
| COM INGRESS | LOAD BALANCER | LOAD BALANCER & VIRTUAL SERVER |

SYSTEMS, METHODS, AND APPARATUS TO IMPROVE CONTAINERIZED APPLICATION VISIBILITY

FIELD OF THE DISCLOSURE

This disclosure relates generally to cloud computing and, more particularly, to systems, methods, and apparatus to improve containerized application visibility.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, networking devices (e.g., routers, switches, etc.), etc.

BRIEF DESCRIPTION OF THE DRAWINGS

FIG. 2 illustrates an example resource mapping table to map the example containers of FIG. 1 to example virtual resources managed by the example virtual resource management controllers of FIG. 1.

Figure 1:
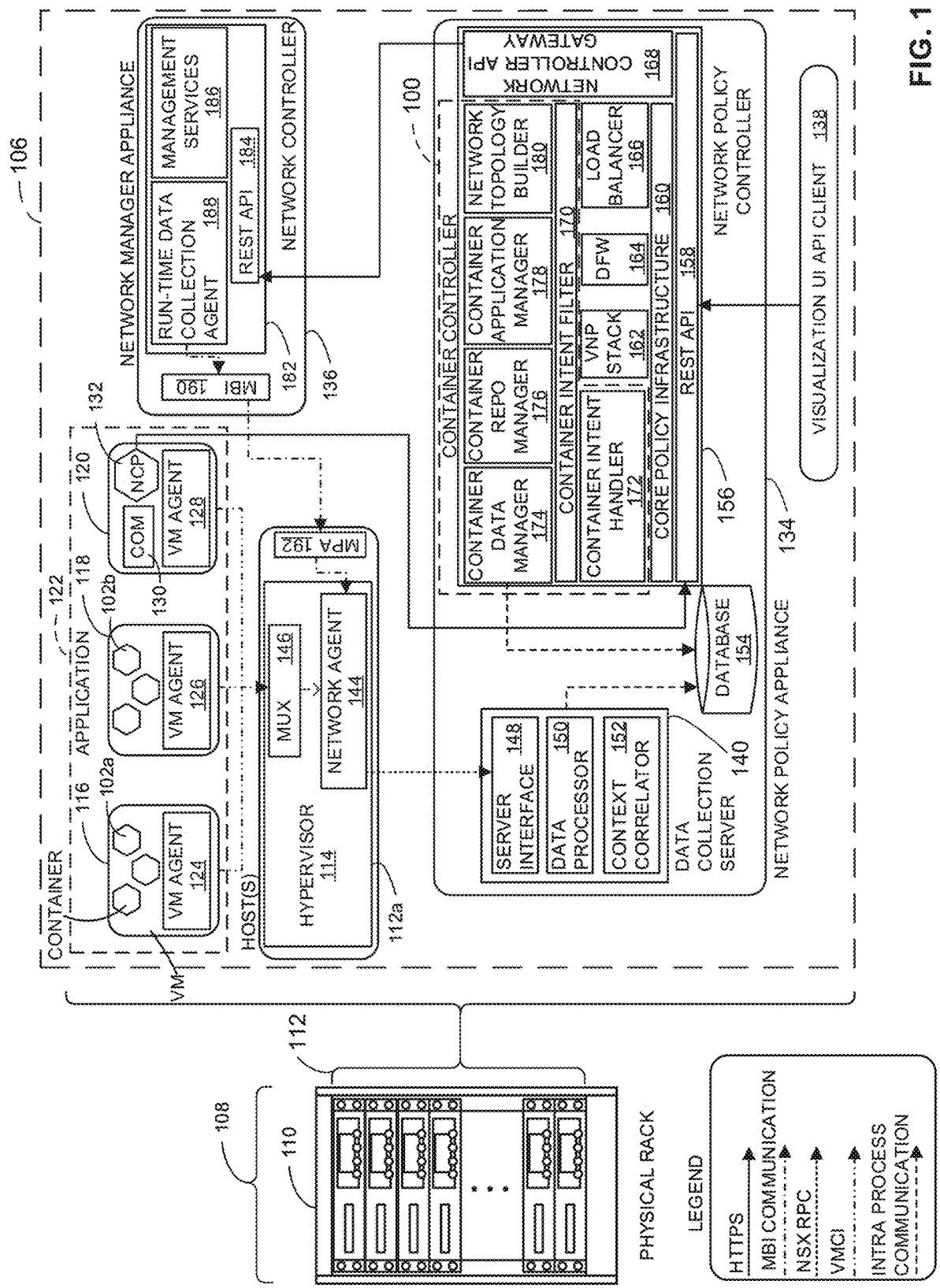
FIG. 1 illustrates an example virtual environment including an example container controller to facilitate operation of example containers in a virtualized server system.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Cloud computing is based on the deployment of many physical resources across a network, virtualizing the physical resources into virtual resources, and provisioning the virtual resources in software defined data centers (SDDCs) for use across cloud computing services and applications. Examples disclosed herein can be used to manage network resources in SDDCs to improve performance and efficiencies of network communications between different virtual and/or physical resources of the SDDCs.

Examples disclosed herein can be used in connection with different types of SDDCs. In some examples, techniques disclosed herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment.

Examples disclosed herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc. Example container orchestration managers include Kubernetes® K8S™ that coordinate and schedule the deployment and execution of containers associated with a distributed application (e.g., a containerized application). As used herein, the term "containerized application" refers to one or more isolated applications or services executing on a single host that have access to the same OS kernel. As used herein, the term "application containerization" refers to an OS-level virtualization method used to deploy and run distributed applications without launching an entire VM for each one of the distributed applications.

Examples disclosed herein can be employed with HCI-based SDDCs deployed using virtual server rack systems. A virtual server rack system can be managed using a set of tools that is accessible to all modules of the virtual server rack system. Virtual server rack systems can be configured in many different sizes. Some systems are as small as four hosts, and other systems are as big as tens of racks. A virtual server rack system can also include software-defined data storage (e.g., storage area network (SAN), VMWARE® VIRTUAL SAN™, etc.) distributed across multiple hosts for redundancy and virtualized networking software (e.g., VMWARE NSX™, etc.).

Examples disclosed herein provide HCI-based SDDCs with system-level governing features that can actively monitor and manage different hardware and software components of a virtual server rack system even when such different hardware and software components execute different OSs. Major components of a virtual server rack system can include a hypervisor, network virtualization software, storage virtualization software (e.g., software-defined data storage, etc.), a physical network OS, and external storage. In some examples, the storage virtualization (e.g., VMWARE VIRTUAL SAN™, etc.) is integrated with the hypervisor. In examples in which the physical network OS is isolated from the network virtualization software, the physical network is not aware of events occurring in the network virtualization environment and the network virtualization environment is not aware of events occurring in the physical network.

In prior container deployments, there is an information gap between first information known to a container orchestration manager and second information known to the major components of the virtual server rack system, such as the network virtualization software. For example, the container orchestration manager may have information corresponding to how containers in a containerized application communicate with each other but do not have information corresponding to how the containers are deployed (e.g., which node, which host, etc., the containers are deployed on). The network virtualization software may have information corresponding to a network topology associated with the containers, such as an Internet Protocol (IP) address of the containers and which ones of logical switches, logical routers, etc., are in communication with the containers. In such examples, troubleshooting issues that arise in connection with the containerized application are problematic due to the lack of visibility at the container orchestration manager and at the major components of the virtual server rack system. Accordingly, prolonged downtime of the containerized application is likely as there is no common protocol or mapping between information included in the containerized application environment and information associated with the deployment of the containerized application in the virtual server rack system.

Examples disclosed herein improve containerized application visibility by providing a new virtualization layer, which corresponds to a Container as a Service (CaaS) stack, to the existing information technology (IT) stack that includes an IaaS stack, a Platform as a Service (PaaS) stack, and a Software as a Service (SaaS) stack. In some disclosed examples, an example container controller facilitates management and operation of the CaaS stack to reduce downtime of a virtual server rack system compared to prior container implementations. For example, the container controller can generate a comprehensive visualization to facilitate troubleshooting and IT management that includes information at the application layer (e.g., container information), the platform layer (e.g., service information), and the infrastructure layer (e.g., host information, VM information, etc.).

In some disclosed examples, the container controller generates and/or otherwise builds a container and VM inventory to identify a container network. The container controller can discover a containerized application based on the container and VM inventory to determine a quantity of containerized applications within a management scope of the container controller. In some disclosed examples, the container controller determines a network topology associated with one or more of the containerized applications using run-time network flow analysis. For example, the container controller may trigger a run-time data collection associated with container network traffic using VM agents included in the VMs that execute the containers. In such examples, the container controller can correlate the network traffic with distributed firewall (DFW) Internet Protocol Flow Information Export (IPFIX) rules to determine the network topology. In some disclosed examples, the container controller generates and launches a visualization based on the network topology to facilitate management and operation of the containerized applications. Advantageously, the example visualization may be used to reduce and/or otherwise eliminate downtime when scaling up the containerized applications (e.g., deploying additional instances of the containerized applications) or identifying potential bottlenecks or inefficiencies with the existing deployment of the containerized applications.

FIG. 1 illustrates an example container controller 100 to facilitate operation of example containers 102a-b in an example virtual environment 106. The virtual environment 106 of FIG. 1 corresponds to a virtual or software-based abstraction of an example physical environment 108. The physical environment 108 of FIG. 1 includes an example physical rack 110 that includes example hosts 112. Alternatively, the physical environment 108 may include more than one physical rack. The hosts 112 are physical servers including hardware-level components that may include one or more central processing units (CPUs), one or more memory devices, one or more storage units, one or more graphics processing units (GPUs), etc.

In the illustrated example of FIG. 1, the host 112a executes an example hypervisor 114, which provides local virtualization services to create the virtual environment 106. The hypervisor 114 may be implemented using any suitable hypervisor (e.g., VMWARE® ESXI® hypervisor, Microsoft HYPER-V® hypervisor, and Kernel Based Virtual Machine (KVM)). For example, the hypervisor 114 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example of FIG. 1, the hypervisor 114 instantiates VMs including an example first VM 116, an example second VM 118, and an example third VM 120. The hypervisor 114 instantiates the VMs 116, 118, 120 to execute an example application 122. In the illustrated example of FIG. 1, the application 122 is a containerized application. For example, the VMs 116, 118, 120 may deploy and/or otherwise include one or more of the containers 102a-b to execute instances of distributed applications or services to facilitate execution of the application 122. In the illustrated example of FIG. 1, the first VM 116 includes a first set of three containers 102a and the second VM 118 includes a second set of three containers 102b. In some examples, each of the containers 102a-b execute a different distributed application. In other examples, one or more of the first containers 102a may execute the same distributed application as one or more of the second containers 102b.

In the illustrated example of FIG. 1, the VMs 116, 118, 120 include a VM agent to intercept and/or otherwise obtain network events, or network traffic events (e.g., one or more data packets, one or more data messages, etc.), associated with the containers 102a-b, the VMs 116, 118, 120, and/or, more generally, the application 122. Accordingly, the first VM 116 includes an example first VM agent 124, the second VM 118 includes an example second VM agent 126, and the third VM 120 includes an example third VM agent 128. In some examples, network traffic from a first VM to a second VM passes through corresponding ones of the VM agents 124, 126, 128. For example, when a first one of the first containers 102a transmits a message to a first one of the second containers 102b, the message may pass through the first VM agent 124 and the second VM agent 126.

In some examples, the network traffic events include container information (container) (e.g., container context information) and/or one or more tuples including at least one of a source IP address (srcIP), a destination IP address (destIP), a source IP port (srcPort) number, a destination IP port (destPort) number, or a protocol identifier (protocol) (e.g., a type of communication protocol (e.g., TCP)). In some examples, the container context information includes a container identifier indicative of one of the containers 102a-b associated with the network traffic event. In some examples, the network traffic events have a format of (srcIP, destIP, srcPort, destPort, protocol, container). For example, when a first one of the first containers 102a communicates with a second one of the second containers 102b, the first VM agent 124 may transmit a first network traffic event to the hypervisor 114 corresponding to the first one of the first containers 102a transmitting a message and the second VM agent 126 may transmit a second network traffic event to the hypervisor 114 corresponding to the first one of the second containers 102b receiving the transmission.

The first network traffic event may be the following: (10.10.20.5, 10.10.30.5, 45543, 3456, TCP, containerX). In some examples, the first VM agent 124 appends a VM agent identifier to the first network traffic event before transmitting the first network traffic event to the hypervisor 114. For example, the first VM agent 124 may generate the following network traffic event by appending the VM agent identifier: (VM Agent 1-10.10.20.5, 10.10.30.5, 45543, 3456, TCP, containerX). In such examples, VM Agent 1 indicates that the network traffic event is from the first VM agent 124.

The second network traffic event may include the following: (10.10.20.5, 10.10.30.5, 45543, 3456, TCP, containerY). In some examples, the second VM agent 126 appends a VM agent identifier to the second network traffic event before transmitting the second network traffic event to the hypervisor 114. For example, the second VM agent 126 may generate the following network traffic event by appending the VM agent identifier: (VM Agent 2-10.10.20.5, 10.10.30.5, 45543, 3456, TCP, containerY). In such examples, VM Agent 2 indicates that the network traffic event is from the second VM agent 126.

In such examples, 10.10.20.5 is a source IP address of the first one of the first containers 102a, 10.10.30.5 is a destination IP address of the first one of the second containers 102b, 45543 is a source IP port of the first one of the first containers 102a, 3456 is a destination port of the first one of the second containers 102b, TCP indicates the message is sent via transmission control protocol (TCP), containerX indicates the first network traffic event is associated with the first one of the first containers 102a, and containerY indicates the second network traffic event is associated with the second one of the second containers 102b. When the hypervisor 114 obtains the first and second network traffic events, the hypervisor 114 determines that the first one of the containers 102a (containerX) is in communication with the second one of the containers 102b (containerY). Over time, the hypervisor 114 can determine a quantity of the containers 102a-b that are communicating, which of the one or more first containers 102a are in communication with which of the one or more second containers 102b, associate ones of the containers 102a-b that are in communication with each other as a cluster, and identify the cluster as the application 122.

Further depicted in the application 122 of FIG. 1, the third VM 120 includes an example container orchestrator manager (COM) 130 and an example network container plugin (NCP) 132. The COM 130 of the illustrated example of FIG. 1 is a container that provisions, schedules, and/or otherwise manages the containers 102a-b. For example, the COM 130 may be a management entry point for a user (e.g., an administrator, an external computing device, etc.) for the containers 102a-b instead of invoking an example network policy appliance 134 to perform an operation associated with the containers 102a-b. For example, the COM 130 may be a container that facilitates Kubernetes® K8S™ to coordinate and schedule the deployment and execution of the containers 102a-b associated with the application 122.

The NCP 132 of the illustrated example of FIG. 1 is a container. In some examples, the NCP 132 registers the COM 130 with the network policy appliance 134. For example, the NCP 132 may obtain container context information from the COM 130 and transmit the container context information to the network policy appliance 134. In such examples, the NCP 132 can determine the container context information by identifying a cluster that includes the VMs 116, 118, 120, ones of the containers 102a-b that are included in the VMs 116, 118, 120, and services associated with the ones of the containers 102a-b. The NCP 132 can transmit the container context information to the network policy appliance 134.

The hypervisor 114 of the illustrated example of FIG. 1 deploys virtual resource management controllers in the virtual environment 106 to facilitate the interaction between physical hardware resources and corresponding virtual resources. Example virtual resource management controllers include the network policy appliance 134 and an example network manager appliance 136. In the illustrated example of FIG. 1, the network policy appliance 134 and the network manager appliance 136 are virtual appliances corresponding to virtual computer images executing in the virtual environment 106. For example, the network policy appliance 134 and the network manager appliance 136 may be pre-configured VM images to be run on a hypervisor. In such examples, the network policy appliance 134 and the network manager appliance 136 can correspond to a software appliance installed on a VM that is packaged into a virtual computer image.

In the illustrated example of FIG. 1, the network policy appliance 134 is a virtual appliance that provides an intent-based system to facilitate the generation, deployment, and/or operation of virtual network resources. For example, the network policy appliance 134 may obtain an input, such as a task, an intent, a requirement, etc., from an example visualization user interface (UI) API client 138 and translate the input into actions to be performed by virtual network resources. In some examples, a task refers to a direction, an instruction, etc., from the visualization UI API client 138 to perform an operational task on one or more management, control, and/or data plane nodes of the host 112a, the application 122, etc. For example, the task may correspond to adjusting and/or otherwise modifying a configuration (e.g., changing an IP address and/or IP port of the hypervisor 114, the first VM 116, etc.), instantiating a logical resource (e.g., configuring and deploying a logical switch, a logical router, etc., to the virtual environment 106), adjusting a network configuration (e.g., adding or deleting a communication link between the first VM 116 and the second VM 118), etc.

The visualization UI API client 138 may obtain the input from a user, a computing device, etc., from a graphical user interface (GUI) launched by the visualization UI API client 138. In some examples, the network policy appliance 134 invokes the visualization UI API client 138 to launch one or more GUIs. In some examples, the network policy appliance 134 obtains an intent corresponding to a tree-based data model of the application 122 and invokes the network manager appliance 136 to realize the intent by instantiating virtual network resources (e.g., a logical switch, a logical router, etc.) to facilitate communication of the virtual components of the application 122.

In some examples, a requirement includes, indicates, and/or otherwise refers to a security, machine learning, availability, capacity, and/or performance requirement for establishing a containerized application in a server rack deployment. For example, a security requirement can indicate adding a firewall (e.g., a third-party security firewall), enabling encryption or disabling encryption in storage resources associated with the application 122, etc. A machine learning requirement can refer to adding a machine learning container (e.g., a neural network) or machine learning hardware. An availability requirement can indicate the level of redundancy required to provide continuous operation expected for the workload domain. A performance requirement can indicate the CPU operating speeds (e.g., CPU gigahertz (GHz)), memory (e.g., gigabytes (GB) of random access memory (RAM)), mass storage (e.g., GB hard drive disk (HDD), GB solid state drive (SSD), etc.), and power capabilities of a workload domain. A capacity requirement can refer to the aggregate number of resources (e.g., aggregate storage, aggregate CPU, aggregate respective hardware accelerators (e.g., field programmable gate arrays (FPGAs), graphic processing units (GPUs)), etc.) across all servers associated with the application 122. In some examples, the requirement includes a quantity of tiers in a containerized application (e.g., a three-tier containerized application, a four-tier containerized application, etc.), a quantity of buffer or excess storage capacity on one or more hosts, a fault tolerance level (e.g., a failure-to-tolerate (FTT) level of three), a duration of the application 122 (e.g., the application 122 to be deleted and associated hardware decomposed after three days, seven days, etc.), etc., and/or a combination thereof.

The network policy appliance 134 of the illustrated example of FIG. 1 includes one or more run-time data collection servers including an example data collection server 140 and an example network policy controller 156. The data collection server 140 of the illustrated example of FIG. 1 obtains container traffic messages from the hypervisor 114 of the host 112a. An example network agent 144 deployed by and/or otherwise included in the hypervisor 114 generates the container traffic messages based on network traffic events from the VM agents 124, 126, 128. For example, the container traffic messages may correspond to network traffic events that are associated with one of the containers 102a-b. In such examples, the container traffic messages can be used to define the application 122, generate a topology associated with the application 122, etc.

In operation, the VM agents 124, 126, 128 obtain network traffic events corresponding to data packets or messages transmitted by one or more of the containers 102a-b, one or more of the VMs 116, 118, 120, and/or, more generally by the application 122. The VM agents 124, 126, 128 may include a VM agent identifier in the network traffic events to indicate to the data collection server 140 which one of the VM agents 124, 126, 128 transmitted a corresponding one of the network traffic events. The VM agents 124, 126, 128 transmit the network traffic events to the network agent 144 via an example multiplexer (MUX) 146. The MUX 146 selects (e.g., sequentially selects) one of the VM agents 124, 126, 128 from which to obtain the network traffic events.

In the illustrated example of FIG. 1, the MUX 146 obtains the network traffic events from the VM agents 124, 126, 128 via virtual machine communication interface (VMCI) protocol. The VMCI can correspond to a high-speed interface that the VMs 116, 118, 120 on the same host (i.e., the host 112a) use to communicate with each other and kernel modules of the host. The network agent 144 correlates and/or otherwise determines whether information included in the network traffic events invoke a distributed firewall (DFW) rule. A DFW rule can correspond to an operation to be executed when a message is sent from a first virtual resource to a second virtual resource. For example, a DFW rule may be to retrieve network resource information including an identifier of the first VM 116 when a message from a first one of the first containers 102a is transmitted to a second one of the second containers 102b. In such examples, the DFW 164 can transmit an identifier for the first VM 116 to the network agent 144. The network agent 144 may associate the identifier for the first VM 116 to a network traffic event corresponding to the message.

If the message invokes one or more of the DFW rules, the network agent 144 aggregates ones of the network traffic events into a container traffic message. In some examples, the container traffic message packages and/or otherwise includes one or more network traffic events, infrastructure topology information associated with an invoking of a DFW rule (e.g., the identifier for the first VM 116), etc. The network agent 144 can transmit the container traffic message to the data collection server 140 for analysis. In some examples, network resource information corresponds information associated with a logical entity such as a name (e.g., an identifier), a description (e.g., a text-based description), a base image, a version (e.g., a firmware version, a software version, etc.), network information (e.g., an IP address, an IP port, a communication protocol, etc.), etc.

In the illustrated example of FIG. 1, the data collection server 140 includes an example server interface 148, an example data processor 150, and an example context correlator 152. The server interface 148 of the illustrated example is a communication interface that obtains container traffic messages from the hypervisor 114. For example, the server interface 148 may be a Rackspace Private Cloud (RPC) server and obtains information from the network agent 144 of the hypervisor 114 via VMWARE NSX™ RPC protocol. Alternatively, the server interface 146 may be any other type of network interface using any other type of protocol to obtain and/or transmit data. In some examples, the server interface 148 queries (e.g., periodically queries) the hypervisor 114 for container traffic messages. Alternatively, the server interface 148 may obtain the container traffic messages when generated. The data processor 150 of the illustrated example processes the container traffic messages by extracting data (e.g., metadata) from the container traffic messages and organizing the extracted data to be analyzed by the context correlator 152. In some examples, the data processor 150 extracts data including the container context information and/or one or more of the tuples associated with the network traffic events as described above. In some examples, the data processor 150 extracts data from the container traffic messages that is associated with an invoking of a DFW rule.

The context correlator 152 of the illustrated example of FIG. 1 generates topology information based on at least one of container context information (e.g., a container pod identifier, an IP address, an IP port, etc., of one of the containers 102a-b), virtual network resources (e.g., a logical router, a logical switch, etc., associated with one of the containers 102a-b), or run-time network traffic associated with the containers 102a-b. For example, the context correlator 152 may generate topology information (e.g., infrastructure topology information, network topology information, etc.) that may be used to generate a topology.

In some examples, the infrastructure topology information corresponds to a table or an inventory of virtual resources (e.g., an organization of the virtual resources) associated with the application 122. For example, the inventory may include the containers 102a-b with corresponding container context information. In other examples, the inventory can include virtual network resources, such as a logical switch, a logical router, etc., and/or information defining and/or otherwise specifying the virtual network resources that are associated with the application 122.

In some examples, the network topology information corresponds to one or more entries in a connection tracker table. For example, the context correlator 152 may generate an entry in the connection tracker table corresponding to the first one of the first containers 102a having a communication connection to the first one of the second containers 102b when the first network traffic event and the second network traffic event as described above have the same tuples.

In some examples, the context correlator 152 can generate the topology information by correlating messages transmitted to components of the application 122 with one or more network virtualization services deployed by the network policy appliance 134, one or more network resources deployed by the network manager appliance 136, etc. The context correlator 152 stores the topology information in an example database 154. For example, the network policy appliance 134 may obtain the topology information from the database 154 and generate a visualization output based on the topology information. In such examples, the network policy appliance 134 can invoke the visualization UI API client 138 to launch a GUI to display the visualization output to a user. In FIG. 1, the data collection server 140 is in communication with the database 154 via an intra process communication protocol. Alternatively, the data collection server 140 may use any other type of protocol.

In the illustrated example of FIG. 1, the network policy appliance 134 includes an example network policy controller 156 to discover, determine, and/or otherwise identify information that can be used to define the application 122 in terms of the containers 102a-b, the VMs 116, 118, 120, and deployed ones of network virtualization services to support the containers 102a-b. The network policy controller 156 is a virtual resource management controller. For example, the network policy controller 156 may obtain a user intent from the visualization UI API client 138, determine whether the user intent is associated with the containers 102a-b, and translate the intent into actions to be executed by the network manager appliance 136. In some examples, the network policy controller 156 determines that a topology that has not been determined for the application 122. In such examples, the network policy controller 156 can invoke the network manager appliance 136 to trigger data collection of network traffic data associated with the application 122 and determine the topology based on the collected network traffic data.

The network policy controller 156 of the illustrated example of FIG. 1 includes an example representational state transfer (REST) API 158, an example core policy infrastructure 160, an example virtual network protocol (VNP) stack 162, an example DFW 164, an example load balancer 166, and an example network controller API gateway 168. The network policy controller 156 includes the REST API 158 to interface with the visualization UI API client 138. In FIG. 1, the REST API 158 is a hypertext transfer protocol secure (HTTPS) interface. For example, the REST API 158 may be an API that uses HTTPS requests to perform a GET, PUT, POST, and/or DELETE operation. For example, the visualization UI API client 138 may use the REST API 158 to perform a GET operation to retrieve information associated with the application 122, a PUT operation to change a state of or update one of the containers 102a-b, a POST operation to create the first VM 116, a DELETE operation to remove one of the first containers 102a, etc. Alternatively, the REST API 158 may be any other type of interface.

In the illustrated example of FIG. 1, the network policy controller 156 includes the core policy infrastructure 160 to provide definitions, drivers, libraries, etc., that can be used to generate, configure, and deploy a virtual resource, such as a host, a VM, a logical router, a logical switch, etc., to the virtual environment 106. For example, the core policy infrastructure 160 may determine how a virtual resource operates. In such examples, the core policy infrastructure 160 can transmit a library for a logical router and configuration information for the logical router to the network manager appliance 136 to deploy the logical router to the application 122. The network policy controller 156 includes the VNP stack 162 to provide definitions, drivers, libraries, etc., that can be used to configure a communication protocol to be used by a virtual network resource. For example, the VNP stack 162 may provide a driver to the network manager appliance 136 to deploy a logical switch to the application 122, where the logical switch is configured communicate using Layer 2 (L2) network fabric, Layer 3 (L3) network fabric, etc., based on the driver. For example, the VNP stack 162 may determine how a virtual network resource operates using one or more communication protocols, network fabrics, etc.

A network fabric, also referred to as a switching fabric, represents a network topology in which components pass data to each other through interconnecting switches. The network fabric can include a plurality of layers associated with the Open Systems Interconnection model (OSI) model such as a physical layer (Layer 0), a data link layer (Layer 1), a network layer (Layer 2), a common services layer (Layer 3), and a protocol mapping layer (Layer 4). For example, a network resource such as a logical switch using Layer 2 makes forwarding decisions based on Layer 2 addresses (e.g., media access control (MAC) addresses, etc.). In other examples, a network resource such as a logical switch makes forwarding decisions based on Layer 3 addresses (e.g., Internet Protocol (IP) addresses, etc.).

The network policy controller 156 includes the DFW 164 to generate, store, and/or otherwise provide access control policies for a virtual resource, such as the VMs 116, 118, 120. In some examples, the DFW 164 includes DFW rules (e.g., operation rules, task rules, etc.) that invoke an operation or task to be executed when a message is generated in the application 122. For example, the DFW 164 may include one or more rules associated with one or more connections established by the application 122. For example, the DFW 164 may include a first operation rule corresponding to a first connection between the first VM 116 and the second VM 118 that, when invoked by a message using the first connection, invokes the DFW 164 to retrieve a first VM identifier of the first VM 116 and a second VM identifier of the second VM 118 from the database 154. In such examples, the DFW 164 can transmit the first and second VM identifiers to the data collection server 140. In other examples, the data collection server 140 can be invoked to obtain the first and second VM identifiers when the first operation rule is invoked.

In some examples, the DFW 164 includes DFW rules (e.g., access rules, firewall rules, etc.) that can be enforced at the VMs 116, 118, 120 to facilitate or prevent access from another virtual resource or an external computing device to the virtual environment 106. In some examples, the DFW 164 is a stateful firewall that monitors a state of active connections and uses the state to determine whether to allow a network packet to proceed through the DFW 164 to a virtual resource.

In some examples, the DFW 164 manages two data tables including a rule table (e.g., a DFW rule table) to store DFW rules and a connection tracker table to cache flow entries for DFW rules with an access action (e.g., allow access, prevent access, etc.). A flow entry can include at least one of a source address, a source port, a destination address, a destination port, or a protocol. DFW rules can be enforced in top-to-bottom ordering. For example, network traffic that goes through the DFW 164 is first matched against the rule table. Each packet is checked against the top rule in the rule table before moving down the subsequent rules in the rule table. The first rule in the table that matches the traffic parameters is enforced. The last rule in the table is the DFW default policy rule. The DFW default policy rule is enforced where the packets do not match any rule above the DFW default policy rule. In some examples, the DFW 164 operates in strict transmission control protocol (TCP) mode, and when using a default block rule, the DFW 164 drops packets that do not satisfy connection requirements. A connection can begin with a three-way handshake (SYN, SYN-ACK, ACK) and end with a two-way exchange (FIN, ACK). For example, if an IP packet (first packet, pkt1) flow 3, that matches rule number 2 is sent by the first VM 116, the following policy lookup and packet flow take place. First, a lookup is performed in the connection tracker table to check if an entry for the flow already exists. Second, because flow 3 is not present in the connection tracker table (e.g., a miss result), a lookup is performed in the rule table to identify which rule is applicable to flow 3. The first rule that matches the flow will be enforced. Third, rule 2 matches flow 3. Fourth, because the Action is set to 'Allow' for flow 3, a new entry is created inside the connection tracker table. The packet is then transmitted out of the DFW 164.

The network policy controller 156 of the illustrated example of FIG. 1 includes the load balancer 166 to distribute network traffic across multiple servers to improve and/or otherwise optimize load distribution. For example, the load balancer 166 may generate or identify a server pool including backend server members and associate a service monitor with the server pool to manage and share the backend servers flexibly and efficiently. In some examples, when the load balancer 166 obtains a request, the load balancer 166 selects the appropriate server(s) to distribute the network traffic. The network policy controller 156 includes the network controller API gateway 168 to interface with the network manager appliance 136. In FIG. 1, the network controller API gateway 168 is an HTTPS interface. For example, the network controller API gateway 168 may be an API that uses HTTPS requests to perform a GET, PUT, POST, and/or DELETE operation. For example, the network policy controller 156 may use the network controller API gateway 168 to perform a GET operation to retrieve information associated with the application 122, a PUT operation to trigger data collection of the VM agents 124, 126, 128, a POST operation to deploy the second VM 118, a DELETE operation to remove one of the second containers 102*b*, etc. Alternatively, the network controller API gateway 168 may be any other type of interface.

In the illustrated example of FIG. 1, the container controller 100 of the network policy controller 156 includes an example container intent filter 170, an example container intent handler 172, an example container data manager 174, an example container repository (REPO) manager 176, an example container application manager 178, and an example network topology builder 180. The container controller 100 includes the container intent filter 170 to filter non-container operations to be facilitated by the network policy controller 156. In some examples, the container intent filter 170 determines whether the intent includes a container parameter or tag associated with the containers 102*a-b*. For example, the container parameter may include an identifier of "NETWORK_CONTAINER_PLUGIN_CLUSTER_X", where X is indicative of a particular cluster. In other examples, the parameter, the tag, etc., may include an identifier of "NETWORK_CONTAINER_PLUGIN_CONTAINER_Y", where Y is indicative of a particular container (e.g., a first one of the first containers 102*a*, a first one of the second containers 102*b*, etc.). For example, the container intent filter 170 may identify a cluster, a container, etc., based on the container parameter. In such examples, the container intent filter 170 can determine whether the intent obtained from visualization UI API client 138 corresponds to one or more of the containers 102*a-b*.

In some examples, a portion of the intent corresponds to one or more of the containers 102*a-b*. In such examples, the container intent filter 170 can transmit a first portion of the intent corresponding to one or more of the containers 102*a-b* to the container intent handler 172 while transmitting a second portion of the intent not corresponding to one or more of the containers 102*a-b* to the core policy infrastructure 160. If the intent does not correspond to one or more of the logical entities associated with the containers 102*a-b*, the container intent filter 170 can transmit the intent to the core policy infrastructure 160 for processing. If the intent corresponds to one or more of the logical entities associated with the containers 102*a-b*, the container intent filter 170 can transmit the intent to the container intent handler 172 for processing.

The container controller 100 of the illustrated example of FIG. 1 includes the container intent handler 172 to translate an intent (e.g., a communicated intent from a user in the form of a tree-based data model) to a virtual workflow and invoke the network manager appliance 136 to realize and/or otherwise implement the virtual workflow. For example, an intent from a user may correspond to a request that the first VM 116 execute an aircraft flight search application to communicate with the second VM 118 executing a payment processing application, where the applications are included in the application 122 that corresponds to an Internet travel booking application. In such examples, the container intent handler 172 can translate the intent entries in the connection tracker table and rules in the rule table managed by the DFW 164. The container intent handler 172 may invoke the network manager appliance 136 to create the communication links in the application 122 based on the entries and the rules.

The container controller 100 of the illustrated example of FIG. 1 includes the container data manager 174 to read from and write to the database 154. For example, the container data manager 174 may be an interface component of the container controller 100, and/or, more generally the network policy controller 156 to obtain topology information from the database 154 via intra process communication. In other examples, the container data manager 174 can store a visualization output, a topology (e.g., an infrastructure topology table, a network topology graph, etc.), etc., in the database 154. The container controller 100 includes the container repository manager 176 to capture and/or otherwise obtain information associated with the containers 102*a-b*. For example, the container repository manager 176 may obtain container context information including a cluster, a namespace, a pod, a service, an ingress or egress policy, etc., associated with the containers 102a-b.

The container controller 100 of the illustrated example of FIG. 1 includes the container application manager 178 to facilitate container application lifecycle management. For example, the container application manager 178 may invoke the network manager appliance 136 to instantiate, modify, and/or delete one of the containers 102a-b. In some examples, the container application manager 178 generates a topology associated with the application 122. For example, the container application manager 178 may generate an infrastructure topology corresponding to an inventory (e.g., an infrastructure inventory) associated with the application 122. In such examples, the container application manager 178 can obtain infrastructure topology information from the database 154 to determine an inventory of the containers 102a-b, the VMs 116, 118, 120, the VM agents 124, 126, 128, virtual network resources associated with the application 122, etc. In some examples, the container application manager 178 generates a visualization based on a topology (e.g., an infrastructure topology, a network topology graph from the network topology builder 180, etc.) and invokes the REST API 158 to output the visualization to a user interface of a computing device via the visualization UI API client 138.

The container controller 100 of the illustrated example of FIG. 1 includes the network topology builder 180 to generate a topology associated with the application 122. In some examples, the network topology builder 180 generates a network topology graph associated with the application 122. For example, the network topology builder 180 may generate a network topology graph including a first one of the first containers 102a-b hosted by the first VM 116, the first VM 116 in communication with a logical switch, the logical switch in communication with a logical router, etc. In some examples, the network topology builder 180 triggers real-time network event collection and analysis to build the network topology graph. For example, the network topology builder 180 may invoke the network manager appliance 136 via the network controller API gateway 168 to invoke the network agent 144 to obtain network traffic events associated with the application 122. In such examples, the network topology builder 180 can generate the network topology graph based on container context information and/or the visualization output obtained from the database 154 that are based on the network traffic events.

In the illustrated example of FIG. 1, the network manager appliance 136 is a virtual appliance that includes an example network controller 182 to generate, deploy, and/or operate virtual network resources based on an intent from the visualization UI API client 138. The network controller 182 is a virtual resource management controller. For example, the network policy appliance 134 may invoke the network controller 182 to realize the intent by instantiating network resources (e.g., a logical switch, a logical router, etc.) to facilitate communication of the virtual components of the application 122. The network controller 182 includes an example REST API 184, example management services 186, and an example run-time data collection agent 188. The network controller 182 includes the REST API 184 to interface with the network policy controller 156 via the network controller API gateway 168. In FIG. 1, the REST API 184 is an HTTPS interface. For example, the REST API 184 may be an API that uses HTTPS requests to perform a GET, PUT, POST, and/or DELETE operation. Alternatively, the REST API 184 may be any other type of interface.

The network controller 182 of the illustrated example of FIG. 1 includes the management services 186 to generate, deploy, and/or operate virtual network resources. In some examples, the management services 186 instantiates, modifies, and/or deletes one of the containers 102a-b, one of the VMs 116, 118, 120, etc. In other examples, the management services 186 can generate a logical entity such as a logical switch, a logical router, etc., that may be used to facilitate communication of the containers 102a-b, the VMs 116, 118, 120, and/or, more generally, the application 122. The network controller 182 of the illustrated example includes the run-time data collection agent 188 to trigger the network agent 144 of the hypervisor 114 to obtain network traffic events associated with the application 122.

In the illustrated example of FIG. 1, the network manager appliance 136 includes an example message broker interface (MBI) 190 to interface with the host 112a. The MBI 190 of FIG. 1 is message-oriented middleware. For example, the MBI 190 may communicate with an example management plane agent (MPA) 192 of the host 112a via MBI protocol. For example, MBI protocol may be Streaming Text Oriented Messaging Protocol (STOMP), Message Queueing Telemetry Transport (MQTT), or any other type of message-oriented protocol. The MPA 192 of the host 112a is an API entry point to the host 112a. In some examples, the MPA 192 persists a user configuration of the host 112a, handles user queries, performs operational tasks on one or more management, control, and/or data plane nodes of the host 112a, etc. In FIG. 1, the MPA 192 provides an interface between the network manager appliance 136 and the network agent 144 of the hypervisor 114 via MBI communication.

While an example manner of implementing the container controller 100, and/or, more generally, the network policy appliance 134, is illustrated in FIG. 1, one or more of the elements, processes, and/or devices illustrated in FIG. 1 may be combined, divided, re-arranged, omitted, eliminated, and/or implemented in any other way. Further, the example container controller 100, the example data collection server 140, the example server interface 148, the example data processor 150, the example context correlator 152, the example database 154, the example network policy controller 156, the example REST API 158, the example core policy infrastructure 160, the example VNP stack 162, the example DFW 164, the example load balancer 166, the example network controller API gateway 168, the example container intent filter 170, the example container intent handler 172, the example container data manager 174, the example container repository manager 176, the example container application manager 178, the example network topology builder 180, and/or, more generally, the example network policy appliance 134 of FIG. 1 may be implemented by hardware, software, firmware, and/or any combination of hardware, software, and/or firmware. Thus, for example, any of the example container controller 100, the example data collection server 140, the example server interface 148, the example data processor 150, the example context correlator 152, the example database 154, the example network policy controller 156, the example REST API 158, the example core policy infrastructure 160, the example VNP stack 162, the example DFW 164, the example load balancer 166, the example network controller API gateway 168, the example container intent filter 170, the example container intent handler 172, the example container data manager 174, the example container repository manager 176, the example container application manager 178, the example network topology builder 180, and/or, more generally, the example network policy appliance 134 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example container controller 100, the example data collection server 140, the example server interface 148, the example data processor 150, the example context correlator 152, the example database 154, the example network policy controller 156, the example REST API 158, the example core policy infrastructure 160, the example VNP stack 162, the example DFW 164, the example load balancer 166, the example network controller API gateway 168, the example container intent filter 170, the example container intent handler 172, the example container data manager 174, the example container repository manager 176, the example container application manager 178, and/or the example network topology builder 180 is/are hereby expressly defined to include a non-transitory computer readable storage device or storage disk such as a memory, a digital versatile disk (DVD), a compact disk (CD), a Blu-ray disk, etc., including the software and/or firmware. Further still, the example network policy appliance 134 of FIG. 1 may include one or more elements, processes, and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 2 illustrates an example resource mapping table 200 to map the containers 102*a-b* of FIG. 1 associated with the COM 130 of FIG. 1 to virtual resources managed by the network policy controller 156 and the network controller 182 of FIG. 1. In some examples, the resource mapping table 200 is generated, updated, and/or otherwise maintained by the container application manager 178 of FIG. 1. For example, the COM 130 may determine container context information associated with the containers 102*a-b* of FIG. 1 corresponding to a cluster (e.g., a cluster identifier), a namespace (e.g., a namespace identifier), a pod (e.g., a pod identifier), a service (e.g., a service identifier), a network policy (e.g., a network policy parameter), and a COM ingress (e.g., a COM ingress parameter indicative of network traffic from the COM 130 to the host 112*a*) as depicted in an example first column 202 of the resource mapping table 200.

In the illustrated example of FIG. 2, the resource mapping table 200 maps the container context information in the first column 202 to policy information determined by the network policy controller 156 depicted in an example second column 204. The policy information of the second column 204 includes information associated with a domain, a provider, a network, and an IP pool mapped to the cluster. The policy information includes information associated with the domain and a segment mapped to the namespace. The policy information includes information associated with a container set and a logical port mapped to the pod. The policy information includes information associated with an application service and an application (e.g., a set of services) mapped to the service. The policy information includes information associated with a communication group mapped to the network policy. The policy information includes information associated with a load balancer mapped to the network policy.

In the illustrated example of FIG. 2, the resource mapping table 200 maps the container context information in the first column 202 to policy information in the second column 204 and network resource information depicted in an example third column 206. The network resource information of the third column 206 includes information associated with a virtual network resource, such as a T0 logical router, a T1 logical router, a logical switch, a logical port, a DFW, and a load balancer and virtual server. For example, the network resource information includes information associated with a logical switch determined by the network controller 182 mapped to the segment determined by the network policy controller 156 mapped to the namespace determined by the COM 130. In operation, for example, the container application manager 178 may obtain the container context information included in the first column 202 from the COM 130 via the REST API 158 of FIG. 1. The container application manager 178 may obtain the policy information included in the second column 204 from the container repository manager 176. The container application manager 178 may obtain the network resource information included in the third column 206 from the management services 186 of the network controller 182 via the REST API 184 of FIG. 1. Accordingly, the container application manager 178 may generate the mapping depicted in FIG. 2 based on the obtained information.

Figure 3:
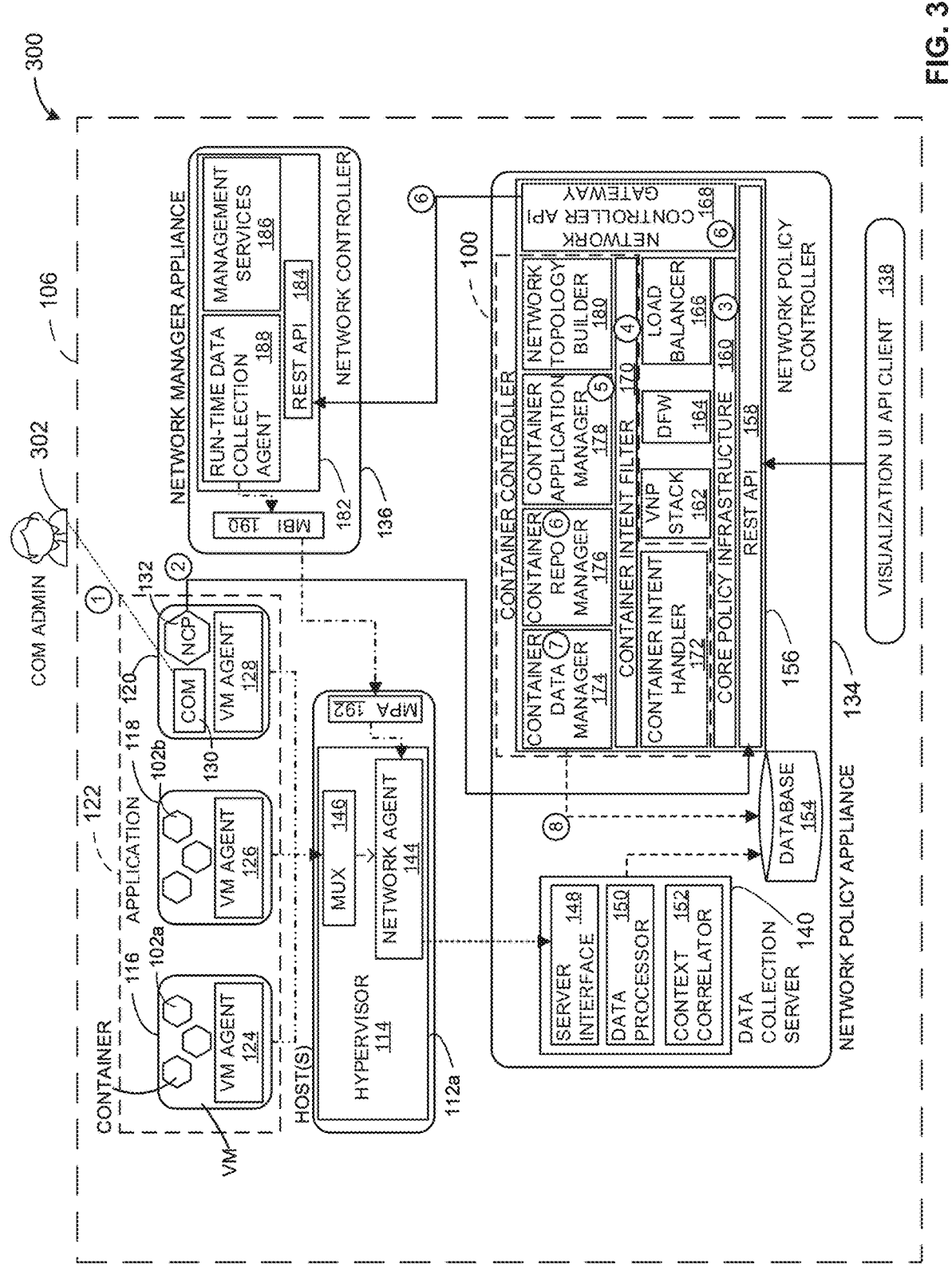
FIG. 3 is a schematic illustration of an example first workflow to provide networking and/or security functions to the example containers of FIG. 1 using the example virtual environment of FIG. 1.

FIG. 3 is a schematic illustration of an example first workflow 300 to provide networking and/or security functions to the containers 102*a-b* of FIG. 1 using the example virtual environment 106 of FIG. 1. At a first operation, an example COM administrator 302 generates an instruction to deploy a virtual network resource (e.g., a logical switch, a DFW, etc.) to the application 122 to facilitate operation of a first one of the first containers 102*a*. For example, the instruction may include container context information such as a cluster, a namespace, a pod, etc., of the first one of the first containers 102*a* to interact with the virtual network resource. At a second operation, in response to the instruction, the COM 130 invokes the NCP 132 to transmit the instruction to the core policy infrastructure 160 via the REST API 158. At a third operation, the core policy infrastructure 160 identifies the virtual network resource to be deployed based on the instruction.

In the illustrated example of FIG. 3, at a fourth operation, the container intent filter 170 determines whether the virtual network resource is to be associated with one of the containers 102*a-b*. When the container intent filter 170 determines that the virtual network resource is to be associated with the first one of the first containers 102*a*, at a fifth operation, the container application manager 178 determines to deploy the virtual network resource to the application 122. At a sixth operation, the container application manager 178 invokes the network controller API gateway 168 to direct the network controller 182 of the network manager appliance 136 to instantiate and deploy the virtual network resource to the application 122. At the sixth operation, the container repository manager 176 determines information associated with the first one of the first containers 102*a*. For example, the container repository manager 176 may determine a cluster, a namespace, a pod, etc., of the first one of the first containers 102*a* based on the instruction. At a seventh operation, the container repository manager 176 invokes the container data manager 174 to store the container context information in the database 154. At an eighth operation, the container data manager 174 stores the container context information in the database 154, which the container application manager 178 may use to generate the resource mapping table 200 of FIG. 2.

Figure 4:
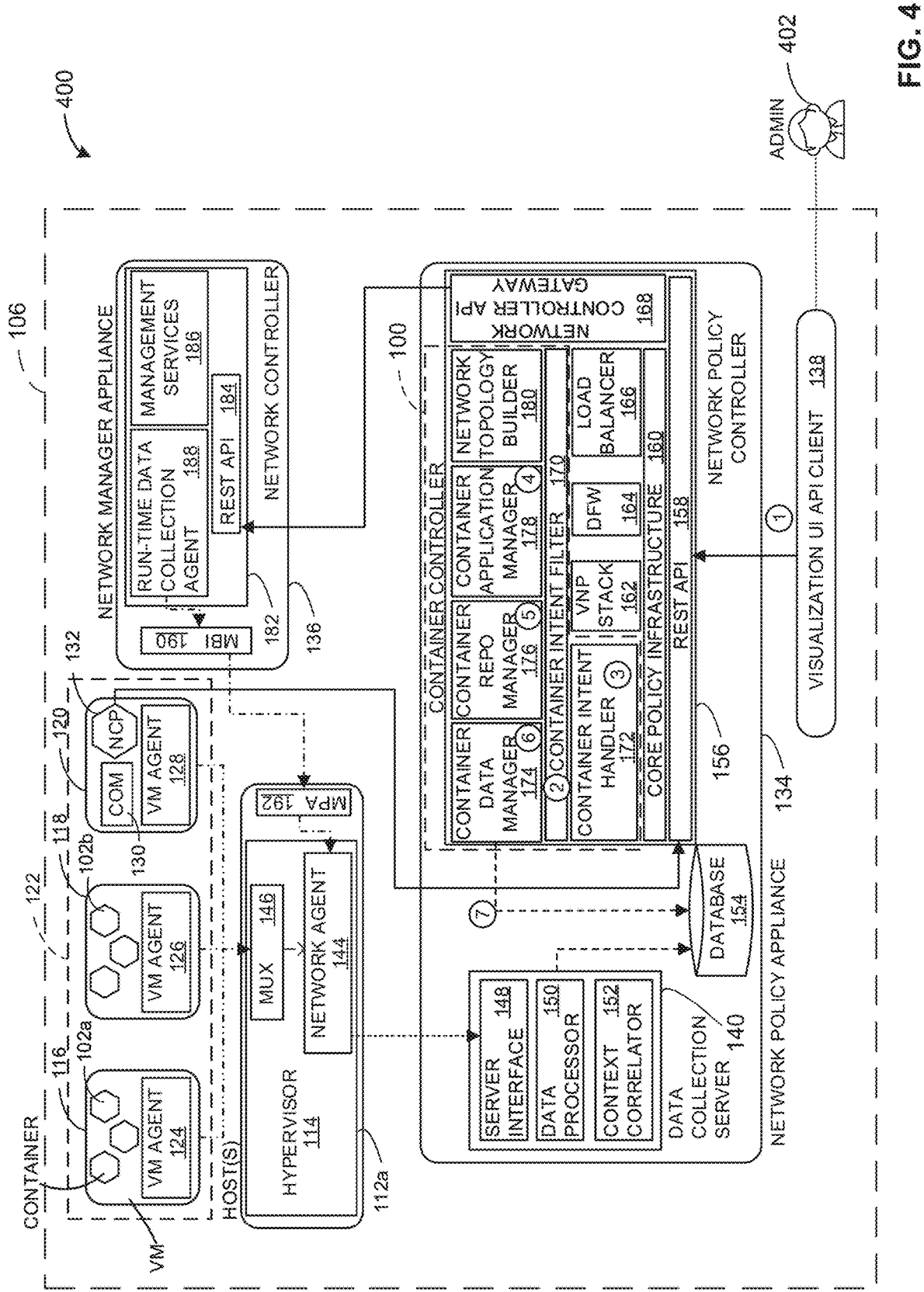
FIG. 4 is a schematic illustration of an example second workflow to define an example application in the example virtual resource management controllers of FIG. 1 using the example virtual environment of FIG. 1.

FIG. 4 is a schematic illustration of an example second workflow 400 to define the application 122 of FIG. 1 in the network policy appliance 134 of FIG. 1 using the virtual environment 106 of FIG. 1. At a first operation, an example administrator (e.g., a user, a network administrator, a computing device, etc.) 402 deploys an intent to the REST API 158 of the network policy controller 156 via the visualization UI API client 138 of FIG. 1. For example, the intent may correspond to a tree-based data model of the application 122. At a second operation, the container intent filter 170 determines whether information associated with the intent corresponds to one of the containers 102a-b. If the container intent filter 170 determines that a portion or an entirety of the information associated with the intent corresponds to one or more of the containers 102a-b, the container intent filter 170 invokes the container intent handler 172 at a third operation to translate the portion or the entirety of the intent to a workflow (e.g., instantiate a first logical switch, configure the first logical switch, deploy the first logical switch, etc.).

At a fourth operation, the container intent handler 172 invokes the container application manager 178 to determine one or more virtual network resources to deploy to the application 122 based on the workflow. At a fifth operation, the container repository manager 176 determines information associated with the workflow. For example, the container repository manager 176 may obtain policy information and network resource information associated with the workflow. In such examples, the container repository manager 176 can map the policy information included in the second column 204 of the resource mapping table 200 of FIG. 2 to the network resource information included in the third column 206 of the resource mapping table 200. At a sixth operation, the container repository manager 176 invokes the container data manager 174 to store the policy information, the network resource information, and/or the mapping of the two in the database 154 at a seventh operation. Accordingly, the application 122 may be defined based on the policy information and/or the network resource information.

Figure 5:
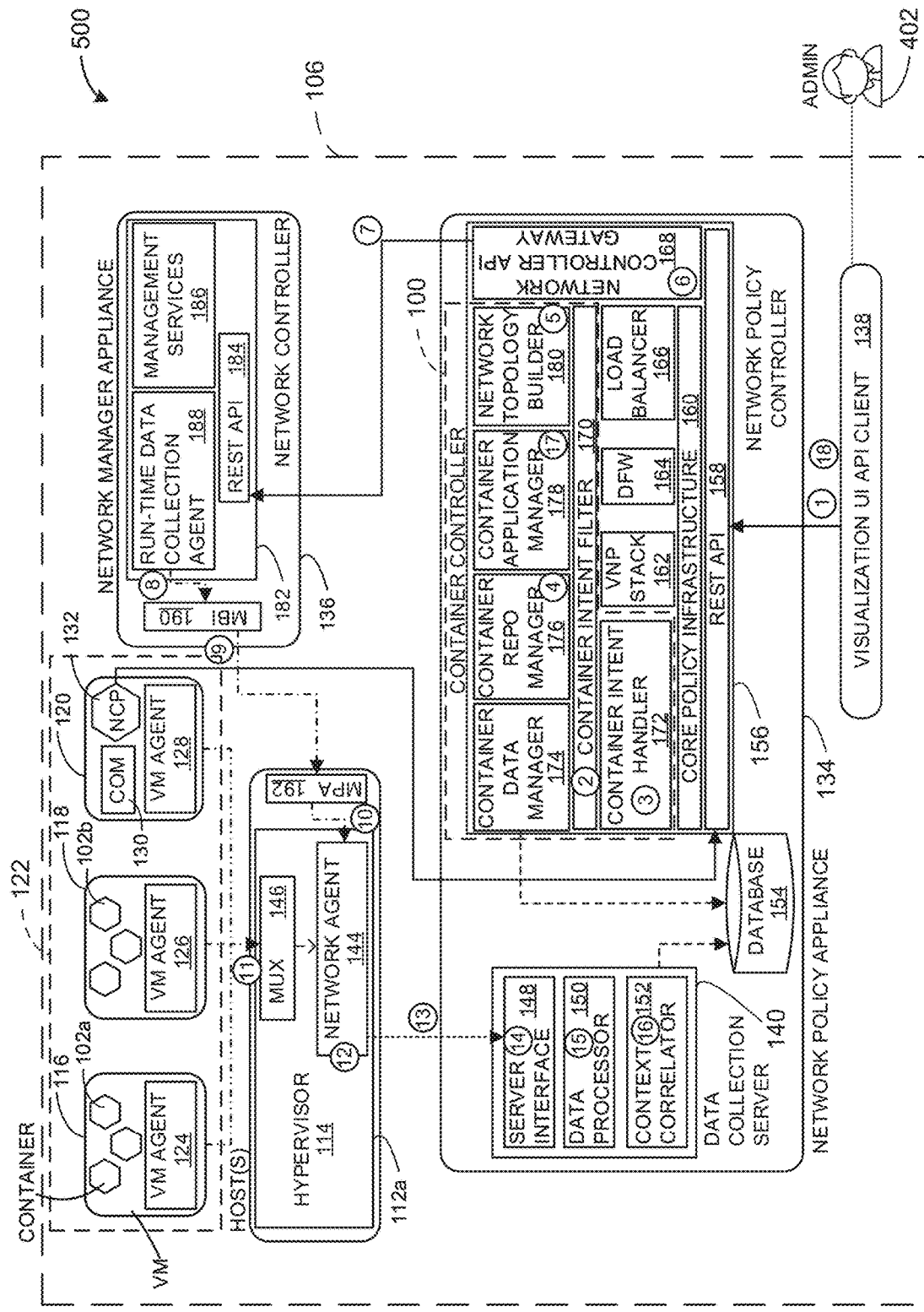
FIG. 5 is a schematic illustration of an example third workflow to detect an example application based on run-time network flow analysis using the example virtual environment of FIG. 1.

FIG. 5 is a schematic illustration of an example third workflow 500 to detect the application 122 of FIG. 1 based on run-time network flow analysis using the virtual environment 106 of FIG. 1. In the illustrated example of FIG. 5, at a first operation, an example administrator 502 generates an intent and transmits the intent via the visualization UI API client 138 to the network policy appliance 134. For example, the intent may correspond to a request to generate a topology (e.g., an infrastructure topology, a network topology graph, etc.) of the application 122.

At a second operation, the container intent filter 170 determines whether the intent corresponds to one or more of the containers 102a-b. At the second operation, in response to the determination that the intent corresponds to one or more of the containers 102a-b, the container intent filter 170 transmits the intent to the container intent handler 172. At a third operation, the container intent handler 172 translates and/or otherwise converts the intent into a workflow. For example, the workflow may correspond to one or more operations to generate the topology based on run-time network flow analysis.

In the illustrated example of FIG. 5, at a fourth operation, the container repository manager 176 determines whether information associated with the one or more containers 102a-b is available. If the container repository manager 176 determines that information associated with the one or more containers 102a-b is unavailable, the container repository manager 176 invokes the network topology builder 180 to generate the topology (e.g., to obtain the information that is not available).

At a sixth operation, the network topology builder 180 instructs the network controller API gateway 168 to invoke the network controller 182 to trigger data collection at a seventh operation. For example, the network controller API gateway 168 may invoke the REST API 184 of the network controller 182. At an eighth operation, the REST API 184 invokes the run-time data collection agent 188 to invoke the network agent 144. For example, the run-time data collection agent 188 may generate an instruction at the eighth operation and direct the MBI 190 to transmit the instruction to the MPA 192 of the host 112a at a ninth operation. The MPA 192 may receive the instruction to trigger data collection at a tenth operation. At the tenth operation, the MPA 192 triggers the network agent 144 to obtain network traffic events associated with the application 122 via the MUX 146 at an eleventh operation. At a twelfth operation, the network agent 144 correlates the network traffic events with DFW rules to generate container traffic messages.

In the illustrated example of FIG. 5, at a thirteenth operation, the network agent 144 transmits the container traffic messages to the server interface 148 of the data collection server 140. At a fourteenth operation, the server interface 148 obtains and transmits the container traffic messages to the data processor 150. At a fifteenth operation, the data processor 150 extracts data (e.g., metadata) from the container traffic messages. At a sixteenth operation, the context correlator 152 generates topology information to be used to generate a topology and stores the topology information in the database 154. At a seventeenth operation, the container application manager 178 obtains the topology information from the database 154 and invokes the network topology builder 180 to build a network topology graph associated with the application 122. At an eighteenth operation, the network policy appliance 134 invokes the visualization UI API client 138 to launch the network topology graph on a user interface to display to the administrator 502. Accordingly, the network policy appliance 134 leverages the virtual environment 106 to detect the application 122 by run-time network flow analysis.

Figure 6:
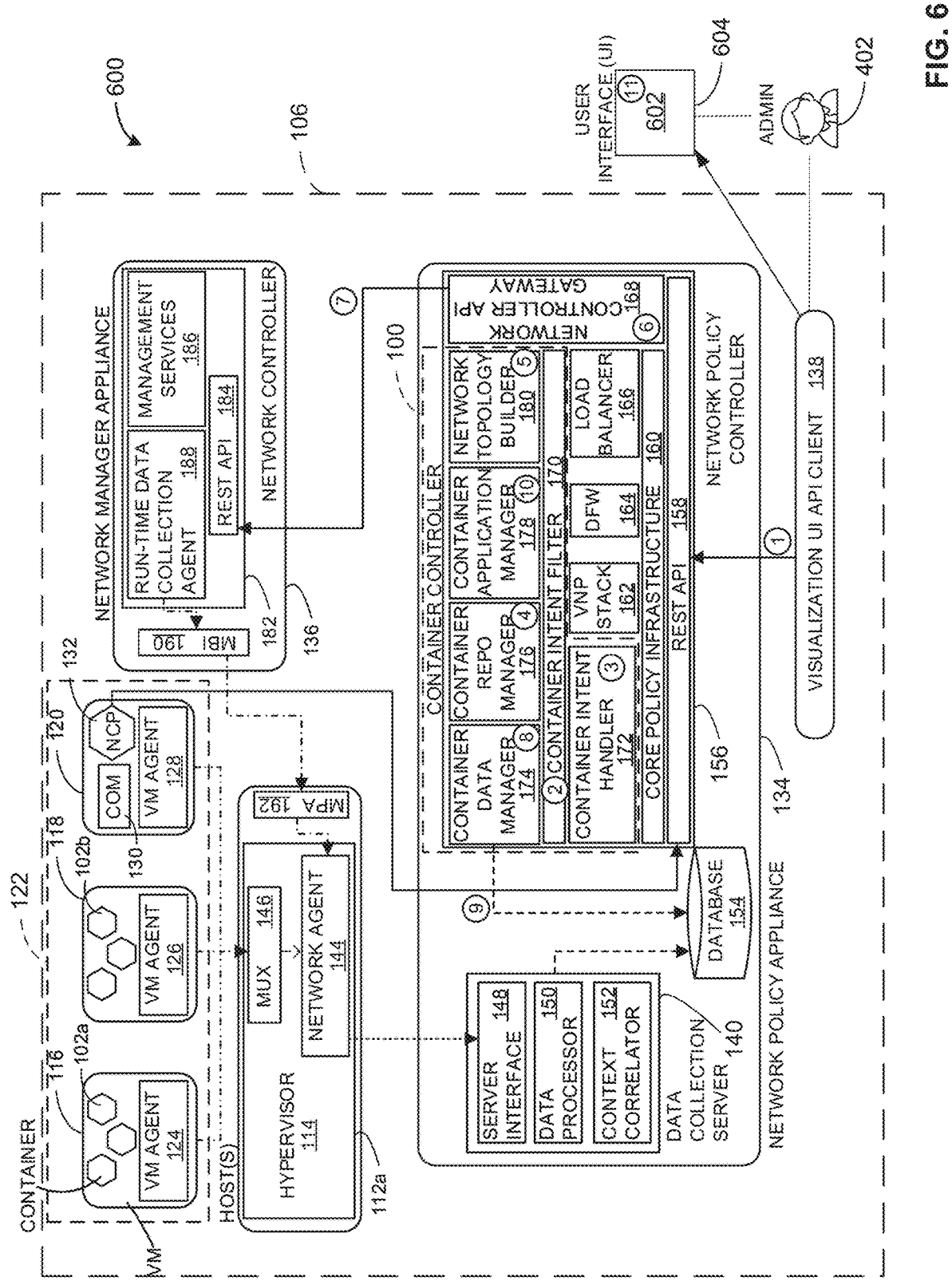
FIG. 6 is a schematic illustration of an example fourth workflow to generate an example first visualization organized based on the example containers of FIG. 1 using the example virtual environment of FIG. 1.

FIG. 6 is a schematic illustration of a fourth example workflow 600 to generate an example first visualization 602 organized based on the containers 102a-b of FIG. 1 using the virtual environment 106 of FIG. 1, and/or, more generally based on the application 122 of FIG. 1. For example, the first visualization 602 may be organized by cluster, namespace, etc., of the containers 102a-b. In such examples, the first visualization 602 can include container context information such as a container host (e.g., the VMs 116, 118, 120), container metadata (e.g., a name, a description, a base image, a version, etc.), network configuration for each corresponding cluster and namespace (e.g., L2 network objects, L3 network objects, a load balancer, a DFW, etc.), etc. In other examples, the first visualization 602 can be organized by the application 122. For example, the first visualization 602 may be organized by the distributed applications executing on the VMs 116, 118, 120.

In the illustrated example of FIG. 6, at a first operation, the administrator 402 of FIG. 4 requests the network policy appliance 134 to generate the first visualization 602 on an example user interface 604 launched on a display of a computing device. For example, the administrator 402 may generate an intent corresponding to the request and communicate the intent to the network policy appliance 134 via the visualization UI API client 138. At a second operation, the container intent filter 170 determines whether the intent corresponds to one or more of the containers 102a-b. If a portion or an entirety of the intent corresponds to one or more of the containers 102a-b, then, at a third operation, the container intent handler 172 translates the portion or the entirety of the intent to a virtual workflow.

In the illustrated example of FIG. 6, at a fourth operation, the container repository manager 176 obtains container context information associated with the containers 102a-b. If the container repository manager 176 determines that container context information is not available, the network topology builder 180 may trigger a data collection process to obtain the container context information. For example, the network topology builder 180 may invoke the network controller API gateway 168 at a sixth operation. In such examples, the network controller API gateway 168 can generate an instruction to trigger a data collection of network traffic events associated with the application 122 by invoking the REST API 184 of the network manager appliance 136 at a seventh operation.

If the container repository manager 176 determines that container context information is available at the fourth operation, the container repository manager 176 invokes the container data manager 174 to obtain the container context information at an eighth operation. At a ninth operation, the container data manager 174 obtains the container context information from the database 154. At a tenth operation, the container application manager 178 generates the first visualization 602 using a topology generated by at least one of the container application manager 178 or the network topology builder 180. For example, the container application manager 178 may generate the first visualization 602 to include the infrastructure topology generated by the container application manager 178 and/or the network topology graph generated by the network topology builder 180. At an eleventh operation, the first visualization 602 is displayed on the user interface 604. For example, the container application manager 178 may direct the REST API 158 to invoke the visualization UI API client 138 to launch the user interface 604 and, thus, display the first visualization 602.

Flowcharts representative of example hardware logic, machine readable instructions, hardware implemented state machines, and/or any combination thereof for implementing the container controller 100, and/or, more generally, the network policy appliance 134 of FIG. 1 are shown in FIGS. 7-11. The machine readable instructions may be one or more executable program(s) or portions of one or more executable program(s) for execution by a computer processor such as the processor 1612 shown in the example processor platform 1600 discussed below in connection with FIG. 16. The program(s) may be embodied in software stored on a non-transitory computer readable storage medium such as a CD-ROM, a floppy disk, a hard drive, a DVD, a Blu-ray disk, or a memory associated with the processor 1612, but the entire program(s) and/or parts thereof could alternatively be executed by a device other than the processor 1612 of FIG. 16 and/or embodied in firmware or dedicated hardware. Further, although the example program(s) is/are described with reference to the flowcharts illustrated in FIGS. 7-11, many other methods of implementing the example container controller 100, and/or, more generally, the network policy appliance 134 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 7-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 7:
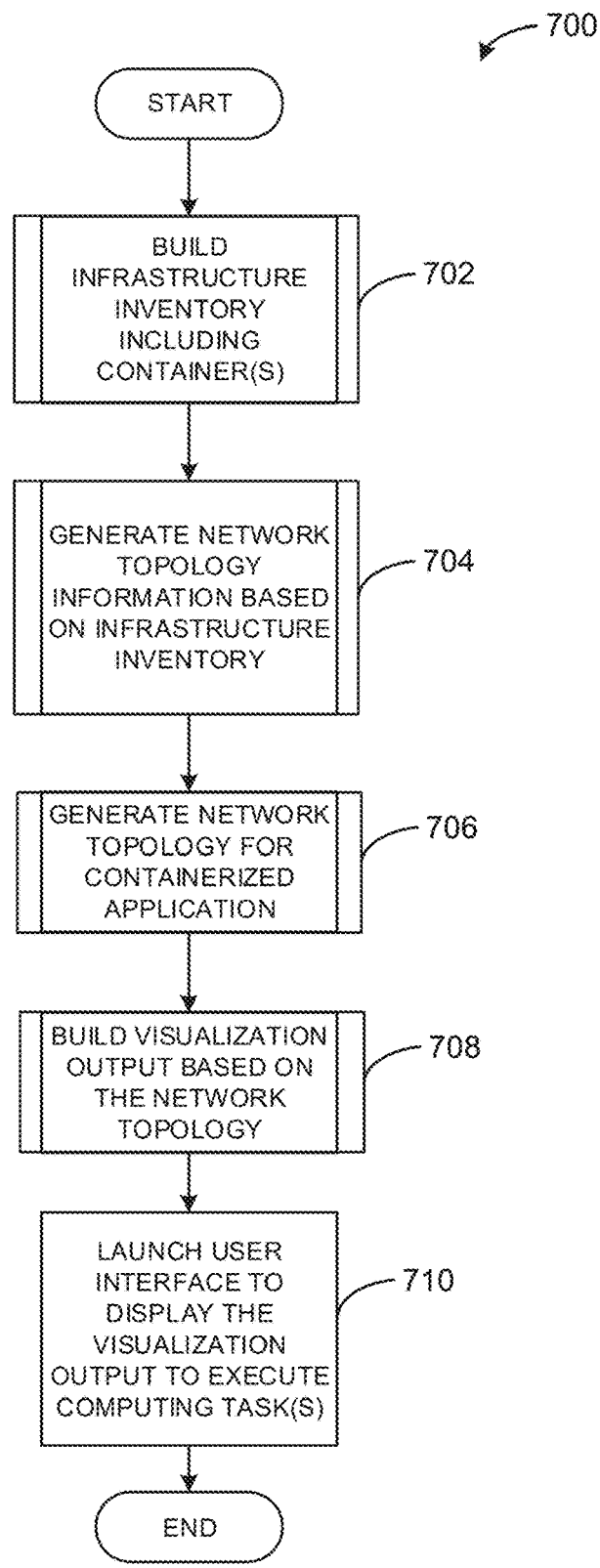
FIG. 7 is a flowchart representative of example machine readable instructions which may be executed to implement the example container controller of FIG. 1 to generate an example visualization based on an example container deployment to execute an example application.

FIG. 7 is a flowchart representative of example machine readable instructions 700 which may be executed to implement the container controller 100 of FIG. 1, and/or, more generally, the network policy appliance 134 of FIG. 1 to generate the first visualization 602 of FIG. 6 based on an example deployment of the containers 102a-b to execute the application 122. The machine readable instructions 700 of FIG. 7 begin at block 702, at which the container controller 100 builds an infrastructure inventory including container(s). For example, the container application manager 178 may generate an inventory of virtual resources associated with the application 122 based on infrastructure topology information from the database 154. An example process that may be used to implement block 702 is described below in connection with FIG. 8.

At block 704, the container controller 100 generates a network topology based on the infrastructure inventory. For example, the container application manager 178 may identify the application 122 as a containerized application including the containers 102a-b based on the infrastructure inventory. An example process that may be used to implement block 704 is described below in connection with FIG. 9.

At block 706, the container controller 100 generates a network topology for the containerized application. For example, the network topology builder 180 may cause the VM agents 124, 126, 128 to obtain network traffic events that can be used to generate a network topology graph for the application 122. An example process that may be used to implement block 706 is described below in connection with FIG. 10.

At block 708, the container controller 100 builds a visualization output based on the network topology. For example, the network topology builder 180 may generate the first visualization 602 of FIG. 6 based on the network topology graph for the application 122. An example process that may be used to implement block 708 is described below in connection with FIG. 11.

At block 710, the container controller 100 launches a user interface to display the visualization output to execute computing task(s). For example, the container application manager 178 may invoke the visualization UI API client 138 to display the first visualization 602 on the user interface 604 of FIG. 6, where the first visualization 602 is based on the infrastructure inventory. In such examples, a user such as the administrator 402 of FIG. 4 may execute one or more computing tasks via the visualization output 602. For example, the administrator 402 may add, modify, and/or delete a virtual resource associated with the application 122. In other examples, the administrator 420 may scale the application 122 by adding virtual resources (e.g., add one or more containers, one or more VMs, etc.), to execute additional computing tasks. In other examples, the network topology builder 180 may invoke the visualization UI API client 138 to display the first visualization 602 on the user interface 604, where the first visualization 602 is based on the network topology graph. In response to launching the user interface to display the visualization, the machine readable instructions 700 of FIG. 7 conclude.

Figure 8:
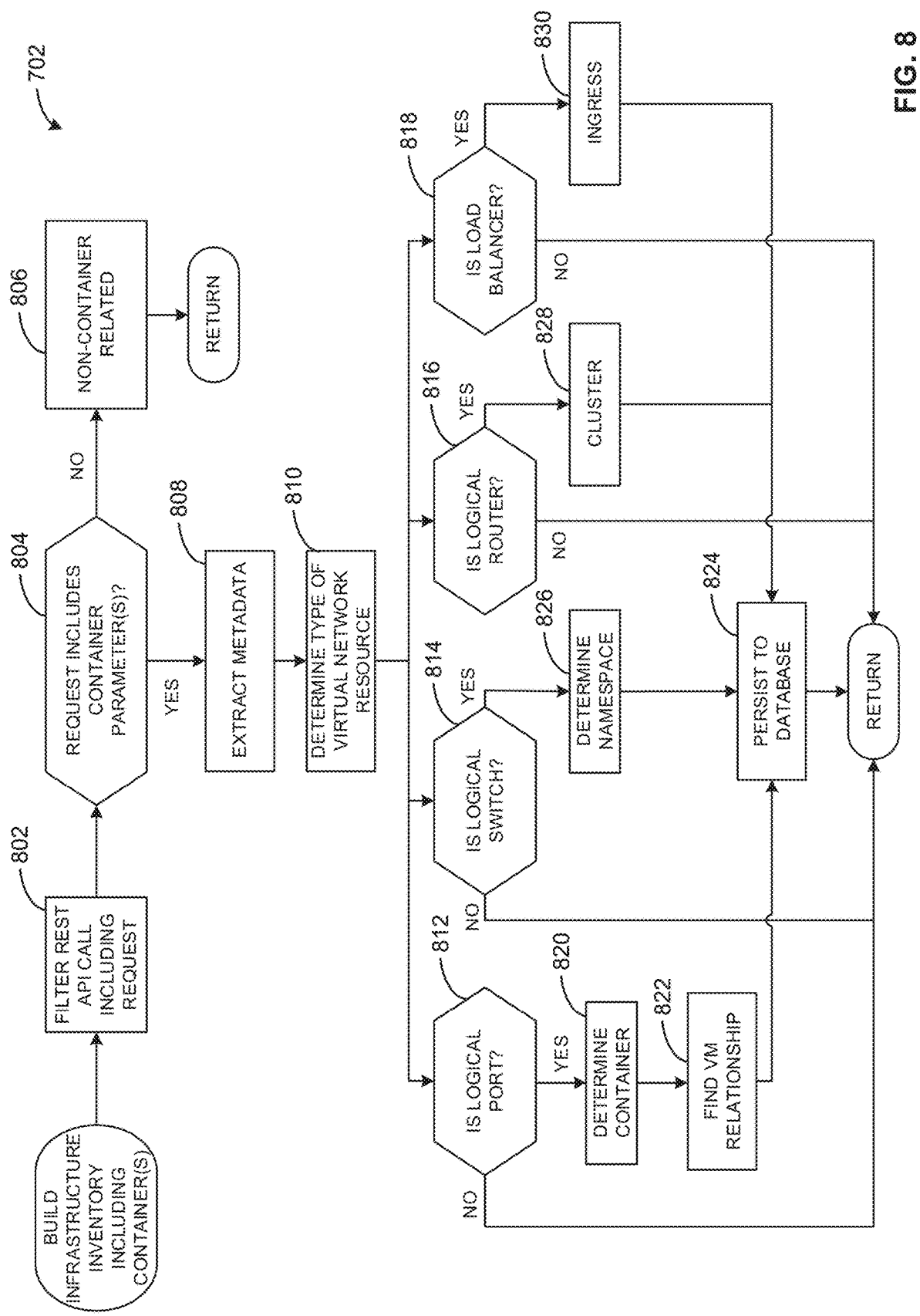
FIG. 8 is a flowchart representative of example machine readable instructions which may be executed to implement the example container controller of FIG. 1 to build an example inventory of the example containers of FIG. 1.

FIG. 8 is a flowchart representative of the machine readable instructions 702 of FIG. 7 which may be executed to implement the container controller 100 of FIG. 1, and/or, more generally, the network policy appliance 134 of FIG. 1 to build an infrastructure inventory including container(s). The machine readable instructions of FIG. 8 may be used to implement block 702 of FIG. 7. The machine readable instructions 702 of FIG. 8 begin at block 802, at which the container controller 100 filters a REST API call including a request. For example, the container intent filter 170 may obtain an intent from the REST API 158 and filter the intent to determine whether a portion or an entirety of the intent corresponds to at least one of the containers 102a-b.

At block 804, the container controller 100 determines whether the request includes container parameter(s). For example, the container intent filter 170 may determine that there is not at least one container parameter included in the intent. In other examples, the container intent filter 170 may determine that there are one or more container parameters included in the intent that correspond to one or more of the containers 102a-b.

If, at block 804, the container controller 100 determines that the request does not include a container parameter, control proceeds to block 806 to identify the request as non-container related. In response to determining that the request is non-container related, the machine readable instructions 702 of FIG. 8 return to block 704 of FIG. 7 to discover a containerized application based on the infrastructure inventory. For example, the container intent filter 170 may transfer the intent to the core policy infrastructure 160 to process the non-container related intent.

If, at block 804, the container controller 100 determines that the request includes one or more container parameters, then, at block 808, the container controller 100 extracts metadata from the request. For example, the container intent handler 172 may extract metadata such as a container cluster vendor, a cluster name, a namespace name, a container name, etc., and/or a combination thereof that are associated with one or more of the containers 102a-b.

At block 810, the container controller 100 determines a type of virtual network resource associated with the intent. For example, the container intent handler 172 may translate the intent to a virtual workflow by determining a virtual network resource affected and/or otherwise associated by the intent. In some examples, the container intent handler 172 determines the virtual network resource type based on a REST API request uniform resource locator (URL) included in the REST API call or information included in a body of the request. For example, the REST API request URL, the body of the request, etc., may include a "LogicalPort" identifier indicating a logical port, a "LogicalSwitch" identifier indicating a logical switch, a "LogicalRouter" identifier indicating a logical router, or a "LoadBalancer" identifier indicating a load balancer. In such examples, the container intent handler 172 can determine whether the virtual network resource associated with the intent is a logical port at block 812, a logical switch at block 814, a logical router at block 816, or a load balancer at block 818 based on the identifier.

At block 812, the container controller 100 determines whether the virtual network resource type is a logical port. If the container controller 100 determines that the virtual network resource is not a logical port at block 812, control returns to block 704 of the machine readable instructions 700 of FIG. 7 to generate network topology information based on infrastructure inventory. If the container controller 100 determines that the virtual network resource type is a logical port, the container controller 100 associates the intent with one of the containers 102a-b at block 820 and finds a VM relationship associated with the one of the containers 102a-b at block 822. For example, the container intent handler 172 may extract a container identifier from the request and determine that the intent is associated with a first one of the first containers 102a based on the container identifier. In such examples, the first one of the first containers 102a is in communication with the logical port. The container intent handler 172 may extract a VM identifier from the request such as "VM_1" to determine that the first VM 116 is the host of the first one of the first containers 102a. The container intent handler 172 may determine the VM relationship by associating the first one of the first containers 102a with the first VM 116. In response to finding the VM relationship at block 822, the container controller 100 persists the VM relationship to a database at block 824. For example, the container intent handler 172 may store the VM relationship in the database 154.

At block 814, the container controller 100 determines whether the virtual network resource type is a logical switch. If the container controller 100 determines that the virtual network resource is not a logical switch at block 814, control returns to block 704 of the machine readable instructions 700 of FIG. 7 to generate network topology information based on infrastructure inventory. If the container controller 100 determines that the virtual network resource type is a logical switch, the container controller 100 extracts a namespace parameter from the request and determines a namespace for a corresponding one of the containers 102a-b based on the namespace parameter at block 826. In response to determining the namespace at block 826, the container controller 100 persists the namespace to the database at block 824.

At block 816, the container controller 100 determines whether the virtual network resource type is a logical router. If the container controller 100 determines that the virtual network resource is not a logical router at block 816, control returns to block 704 of the machine readable instructions 700 of FIG. 7 to generate network topology information based on infrastructure inventory. If the container controller 100 determines that the virtual network resource type is a logical router, the container controller 100 extracts a cluster parameter from the request and determines a cluster for a corresponding one of the containers 102a-b based on the cluster parameter at block 828. In response to determining the cluster at block 828, the container controller 100 persists the cluster to the database at block 824.

At block 818, the container controller 100 determines whether the virtual network resource type is a load balancer. If the container controller 100 determines that the virtual network resource is not a load balancer at block 818, control returns to block 704 of the machine readable instructions 700 of FIG. 7 to generate network topology information based on infrastructure inventory. If the container controller 100 determines that the virtual network resource type is a load balancer, the container controller 100 extracts an ingress parameter from the request and determines an ingress for a corresponding one of the containers 102a-b based on the ingress parameter at block 830. In response to determining the ingress at block 828, the container controller 100 persists the ingress to the database at block 824. In response to persisting the VM relationship, the namespace, the cluster, or the ingress to the database 154, the machine readable instructions 702 of FIG. 8 return to block 704 of FIG. 7 to discover a containerized application based on the infrastructure inventory.

Figure 9:
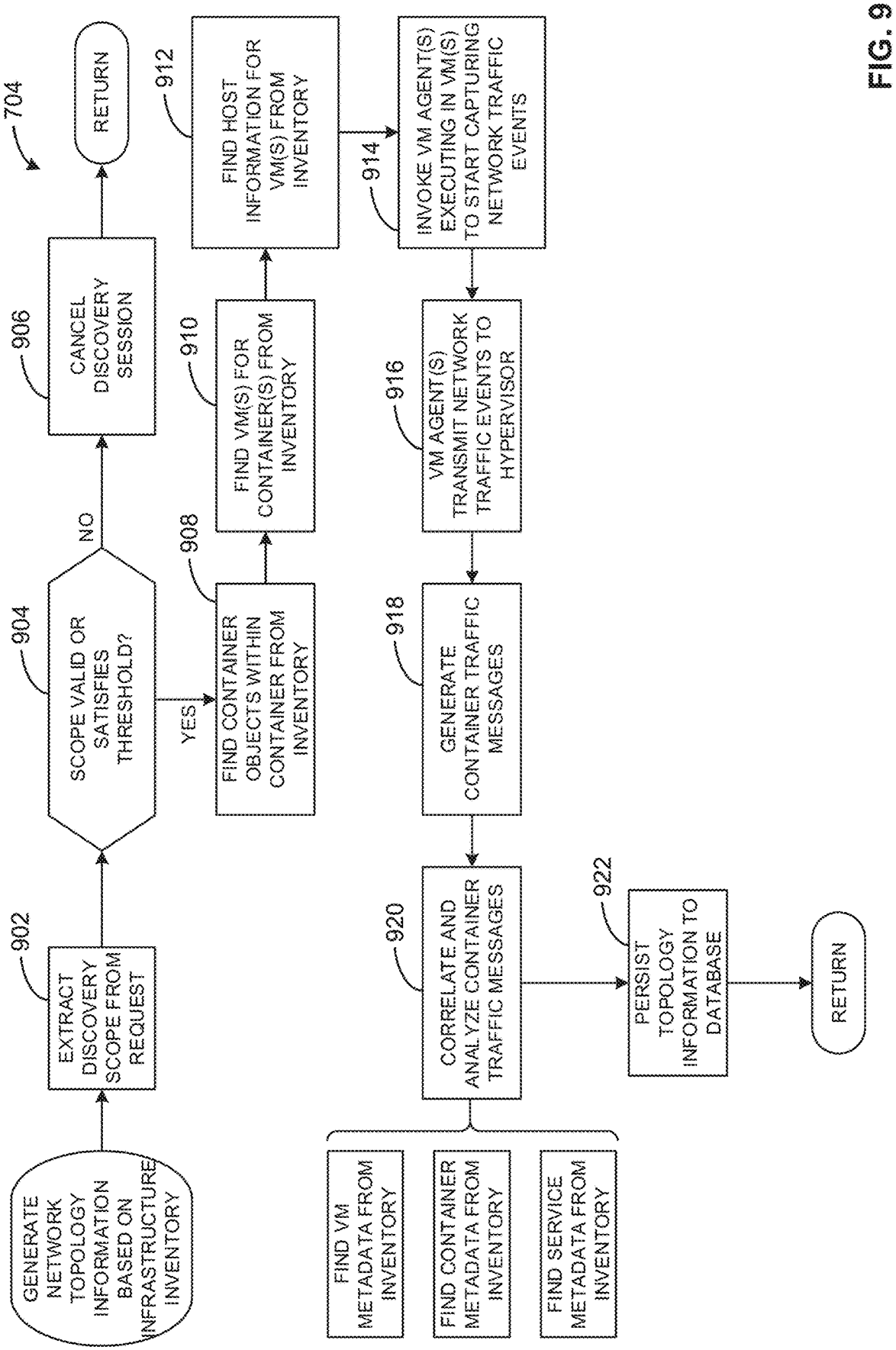
FIG. 9 is a flowchart representative of example machine readable instructions which may be executed to implement the example container controller of FIG. 1 to generate network topology information of an example containerized application.

FIG. 9 is a flowchart representative of the machine readable instructions 704 of FIG. 7 which may be executed to implement the container controller 100 of FIG. 1, and/or, more generally, the network policy appliance 134 of FIG. 1 to generate network topology information based on the infrastructure inventory. The machine readable instructions of FIG. 9 may be used to implement block 704 of FIG. 7. The machine readable instructions 704 of FIG. 9 begin at block 902, at which the container controller 100 extracts a discovery scope from a request. For example, the container intent handler 172 may determine that the intent corresponds to discovering and/or otherwise identifying a container cluster, a container namespace, or a set of user-defined groups.

At block 904, the container controller 100 determines whether the scope is valid or satisfies a threshold. For example, the container intent handler 172 may determine that the scope corresponds to four container clusters. In such examples, the container intent handler 172 can determine that the scope is invalid because there may be only two container clusters. In other examples, the container intent handler 172 may determine that the scope corresponds to 50 containers and satisfies a container quantity threshold of 30 containers because the scope corresponds to more containers than the container quantity threshold.

If, at block 904, the container controller 100 determines that the scope is invalid or satisfies a threshold, control proceeds to block 906 to cancel the discovery session. In response to canceling the discovery session at block 906, the machine readable instructions 704 return to block 706 of FIG. 7 to build a network topology for the containerized application.

If, at block 904, the container controller 100 determines that the scope is valid or does not satisfy a threshold, then, at block 908, the container controller 100 finds container objects within a container from the inventory. For example, the container repository manager 176 may determine one or more of the containers 102a-b in the scope. In such examples, the container repository manager 176 can obtain the container objects including a namespace, a cluster, an ingress, etc., of the one or more containers 102a-b from the database 154.

At block 910, the container controller 100 finds VM(s) for container(s) from the inventory. For example, the container repository manager 176 may determine which of the VMs 116, 118, 120 include the one or more containers 102a-b. At block 912, the container controller 100 finds host information for the VM(s) from the inventory. For example, the container repository manager 176 may determine that the hypervisor 114 of the host 112a hosts the VMs 116, 118, 120.

At block 914, the container controller 100 invokes VM agent(s) executing in the VM(s) to start capturing network traffic events. For example, the network topology builder 180 may cause the VM agents 124, 126, 128 to obtain network traffic events associated with the application 122. At block 916, the VM agent(s) transmit network traffic events to the hypervisor 114. For example, the network topology builder 180 may cause the VM agents 124, 126, 128 to transmit network traffic events to the hypervisor 114 of the host 112a. At block 918, the hypervisor 114 generates container traffic messages. For example, the network topology builder 180 may cause the network agent 144 of the hypervisor 114 to generate container traffic messages based on the network traffic events.

At block 920, the network policy appliance 134 correlates and analyzes container traffic messages. For example, the network topology builder 180 may cause the context correlator 152 to find VM metadata, container metadata, and/or service metadata based on the infrastructure topology information from the database 154. In such examples, the network topology builder 180 can cause the context correlator 152 of the data collection server 140 to generate topology information (e.g., network topology information) based on at least one of the VM metadata, the container metadata, or the service metadata. In response to correlating and analyzing the container traffic messages at block 920, the container controller 100 persists topology information to the database 154. In response to persisting the topology information to the database 154, the machine readable instructions 704 of FIG. 9 return to block 706 of FIG. 7 to build a network topology for the containerized application.

Figure 10:
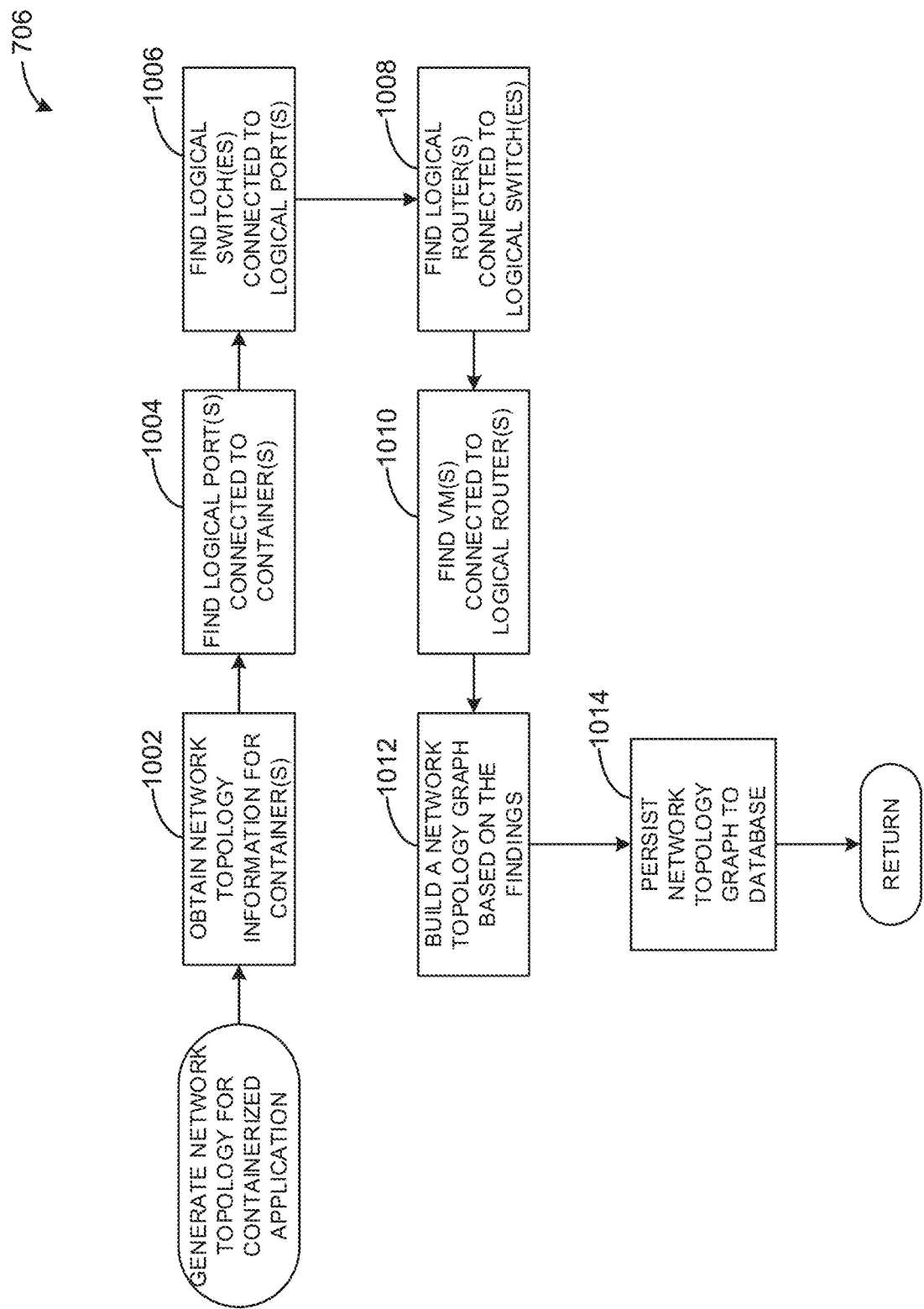
FIG. 10 is a flowchart representative of example machine readable instructions which may be executed to implement the example container controller of FIG. 1 to generate an example network topology for an example containerized application.

FIG. 10 is a flowchart representative of the machine readable instructions 706 of FIG. 7 which may be executed to implement the container controller 100 of FIG. 1, and/or, more generally, the network policy appliance 134 of FIG. 1 to generate a network topology for the containerized application. The machine readable instructions of FIG. 10 may be used to implement block 706 of FIG. 7. The machine readable instructions 706 of FIG. 10 begin at block 1002, at which the container controller 100 obtains container context information. For example, the network topology builder 180 may obtain network topology information associated with one or more of the containers 102a-b.

At block 1004, the container controller 100 finds logical port(s) connected to the container(s). For example, the network topology builder 180 may identify one or more logical ports associated with one or more of the containers 102a-b based on the network topology information from the database 154. At block 1006, the container controller 100 finds logical switch(es) that are connected to the logical port(s). For example, the network topology builder 180 may identify one or more logical switches associated with the one or more logical ports identified at block 1004.

At block 1008, the container controller 100 finds logical router(s) that are connected to the logical switch(es). For example, the network topology builder 180 may identify one or more logical routers associated with the one or more logical switches identified at block 1006. At block 1010, the container controller 100 finds VM(s) that are connected to the logical router(s). For example, the network topology builder 180 may identify one or more of the VMs 116, 118, 120 associated with the one or more logical routers identified at block 1008.

At block 1012, the container controller 100 builds a network topology graph based on the findings. For example, the network topology builder 180 may generate a network topology graph based on connections between at least one of the containers 102a-b, the one or more logical ports, the one or more logical switches, the one or more logical routers, or the one or more VMs 116, 118, 120. At block 1014, the container controller 100 persists the network topology graph to the database 154. For example, the network topology builder 180 may store the network topology graph in the database 154. In response to persisting the network topology graph to the database 154 at block 1014, the machine readable instructions 706 of FIG. 10 return to block 708 of FIG. 7 to build a visualization output based on the network topology.

Figure 11:
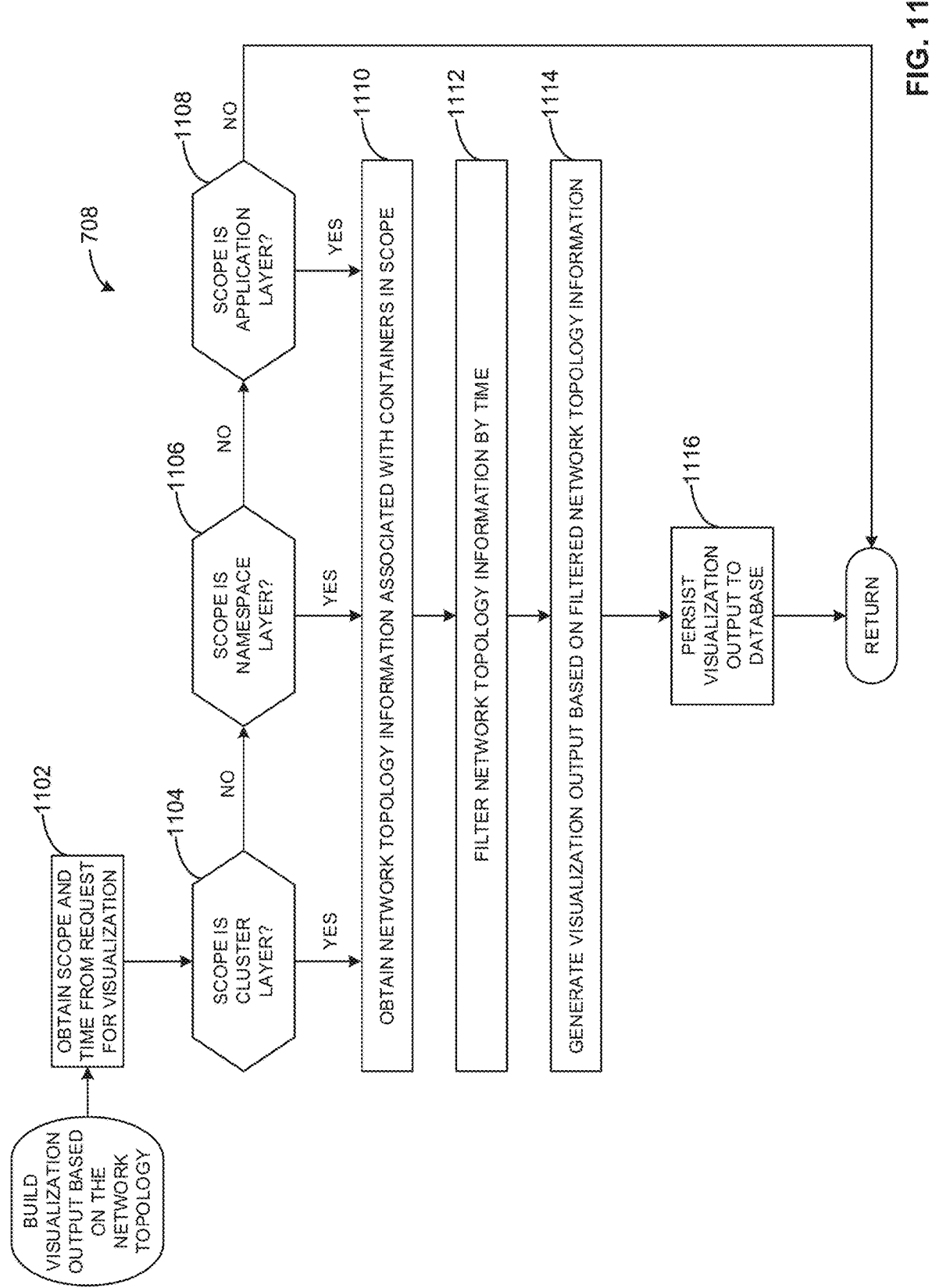
FIG. 11 is a flowchart representative of example machine readable instructions which may be executed to implement the example container controller of FIG. 1 to build an example visualization of an example containerized application.

FIG. 11 is a flowchart representative of the machine readable instructions 708 of FIG. 7 which may be executed to implement the container controller 100 of FIG. 1, and/or, more generally, the network policy appliance 134 of FIG. 1 to build a visualization output based on the network topology. The machine readable instructions of FIG. 11 may be used to implement block 708 of FIG. 7. The machine readable instructions 708 of FIG. 11 begin at block 1102, at which the container controller 100 obtains scope and time information from the request for the visualization. For example, the network topology builder 180 may determine a scope and a time (e.g., a timestamp range, a cutoff timestamp, etc.) for the visualization to be generated. In such examples, the network topology builder 180 can determine that the scope for the visualization is at a cluster layer, a namespace layer, or an application layer.

At block 1104, the container controller 100 determines whether the scope is at the cluster layer. If the container controller 100 determines that the scope is not at the cluster layer, control proceeds to block 1106 to determine whether the scope is at the namespace layer. If the container controller 100 determines that the scope is not at the application layer, the machine readable instructions 708 returns to block 710 of FIG. 7 to launch the user interface to display the visualization to execute computing task(s).

If the container controller 100 determines that the scope is the cluster layer at block 1104, the scope is the namespace layer at block 1106, or the scope is the application layer, then, at block 1110, the container controller 100 obtains network topology information associated with containers included in the corresponding scope. For example, the network topology builder 180 may obtain network topology information associated with all of the containers 102a-b of the application 122 when the scope is the application layer.

At block 1112, the container controller 100 filters the network topology information by time. For example, the network topology builder 180 may remove network topology information with a timestamp before a cutoff timestamp included in the request. At block 1114, the container controller 100 generates a visualization output based on the filtered network topology information. For example, the network topology builder 180 may generate the first visualization 602 of FIG. 6 based on the filtered network topology information.

At block 1116, the container controller 100 persists the visualization output to the database 154. For example, the network topology builder 180 may store the first visualization 602 in the database 154. In response to persisting the visualization output to the database at block 1116, the machine readable instructions 708 of FIG. 11 return to block 710 of FIG. 7 to launch a user interface to display the visualization output.

Figure 12:
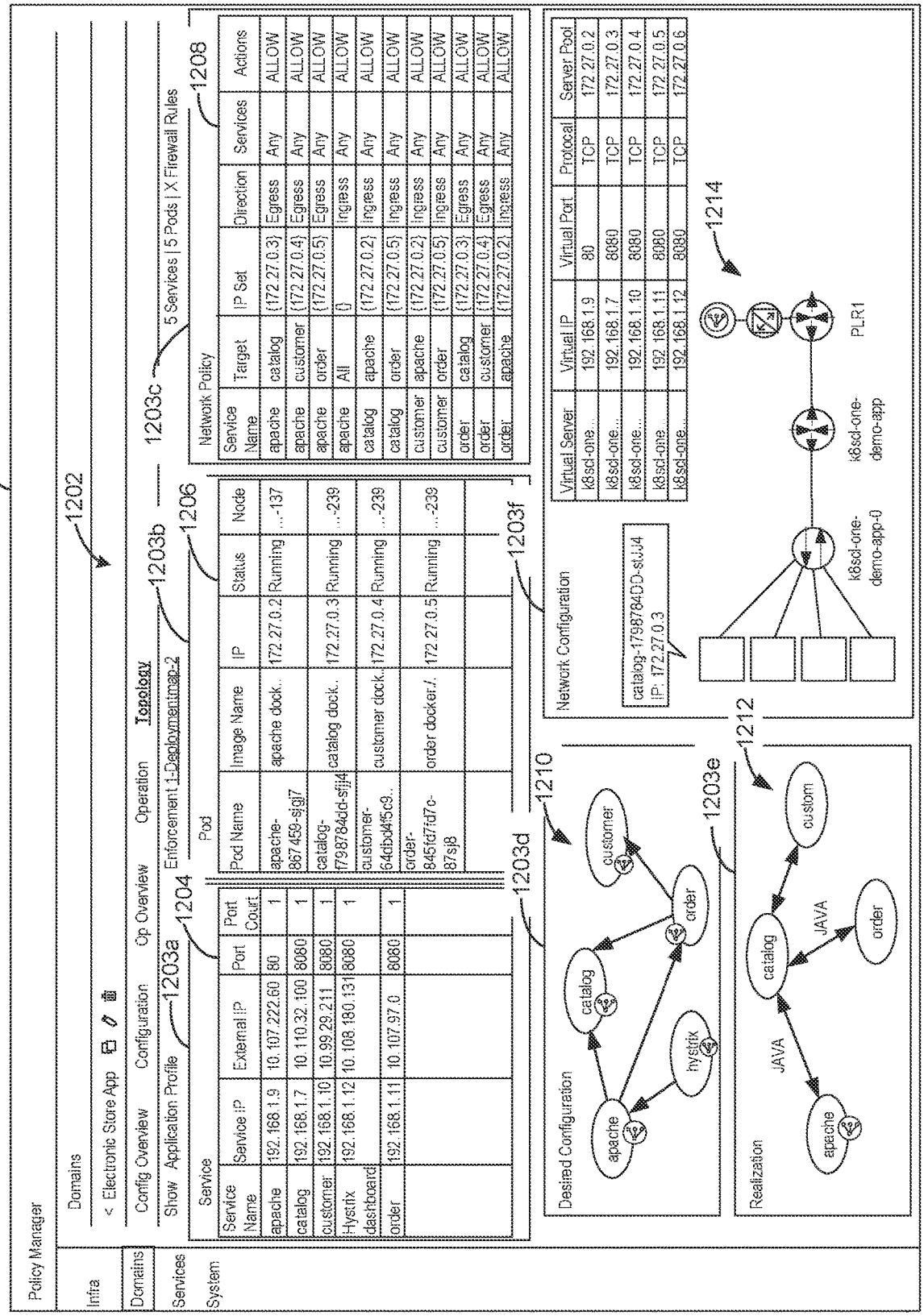
FIG. 12 is an example user interface depicting an example topology of an example containerized application generated by the example container controller of FIG. 1.

FIG. 12 is an example user interface 1200 depicting an example first UI visualization 1202 corresponding to the application 122 of FIG. 1. The user interface 1200 of FIG. 12 may correspond to the user interface 604 of FIG. 6. The first UI visualization 1202 may correspond to the first visualization 602 of FIG. 6. The first UI visualization 1202 of the illustrated example of FIG. 1 includes example visualization panes or windows 1203*a-f* that include an example first infrastructure topology 1204, an example second infrastructure topology 1206, an example DFW rules table 1208, an example intent 1210, an example realized workflow 1212, and example container context information 1214. In FIG. 12, an example first visualization pane 1203*a* displays the first infrastructure topology 1204. In FIG. 12, an example second visualization pane 1203*b* displays the second infrastructure topology 1206. In FIG. 12, an example third visualization pane 1203*c* displays the DFW rules table 1208. In FIG. 12, an example fourth visualization pane 1203*d* displays the intent 1210. An example fifth visualization pane 1203*e* displays the realized workflow 1212. An example sixth visualization pane 1203*f* displays the container context information 1214.

In the illustrated example of FIG. 12, the first infrastructure topology 1204 includes first infrastructure topology information corresponding to services associated with the containers 102*a-b* of FIG. 1. The second infrastructure topology 1206 includes second infrastructure topology information corresponding to pods associated with the containers 102*a-b*. The DFW rules table 1208 includes a plurality of DFW rules. In FIG. 12, a first one of the plurality of DFW rules corresponds to a service 'apache' in communication with a target 'catalog' with a corresponding IP set of '{172.27.0.3}'. The first DFW rule can be invoked when a network message from 'apache' to 'catalog' is transmitted. When the network message is transmitted, the DFW 164 of FIG. 1 executes an 'ALLOW' action to enable the network message to be transmitted to 'catalog'. In some examples, the DFW 164 may add a corresponding entry to a connection tracker table when the first DFW rule is invoked.

In the illustrated example of FIG. 12, the intent 1210 corresponds to an intent, a request, etc., from a user via the visualization UI API client 138 of FIG. 1. In FIG. 12, the intent 1210 is a tree-based data model of a desired configuration of the services to be associated with the application 122. In FIG. 12, the realized workflow 1212 corresponds to an output by the container intent handler 172 of FIG. 1. For example, the container intent handler 172 may translate the intent 1210 to the realized workflow 1212 of FIG. 12. In FIG. 12, the container context information 1214 corresponds to information obtained when the NCP 132 of FIG. 1 registers the COM 130 of FIG. 1 with the network policy appliance 134 of FIG. 1. For example, the container context information 1214 may correspond to a mapping of information known to the COM 130 to information known by the network policy appliance 134 to establish a common framework to facilitate container lifecycle management.

Figure 13:
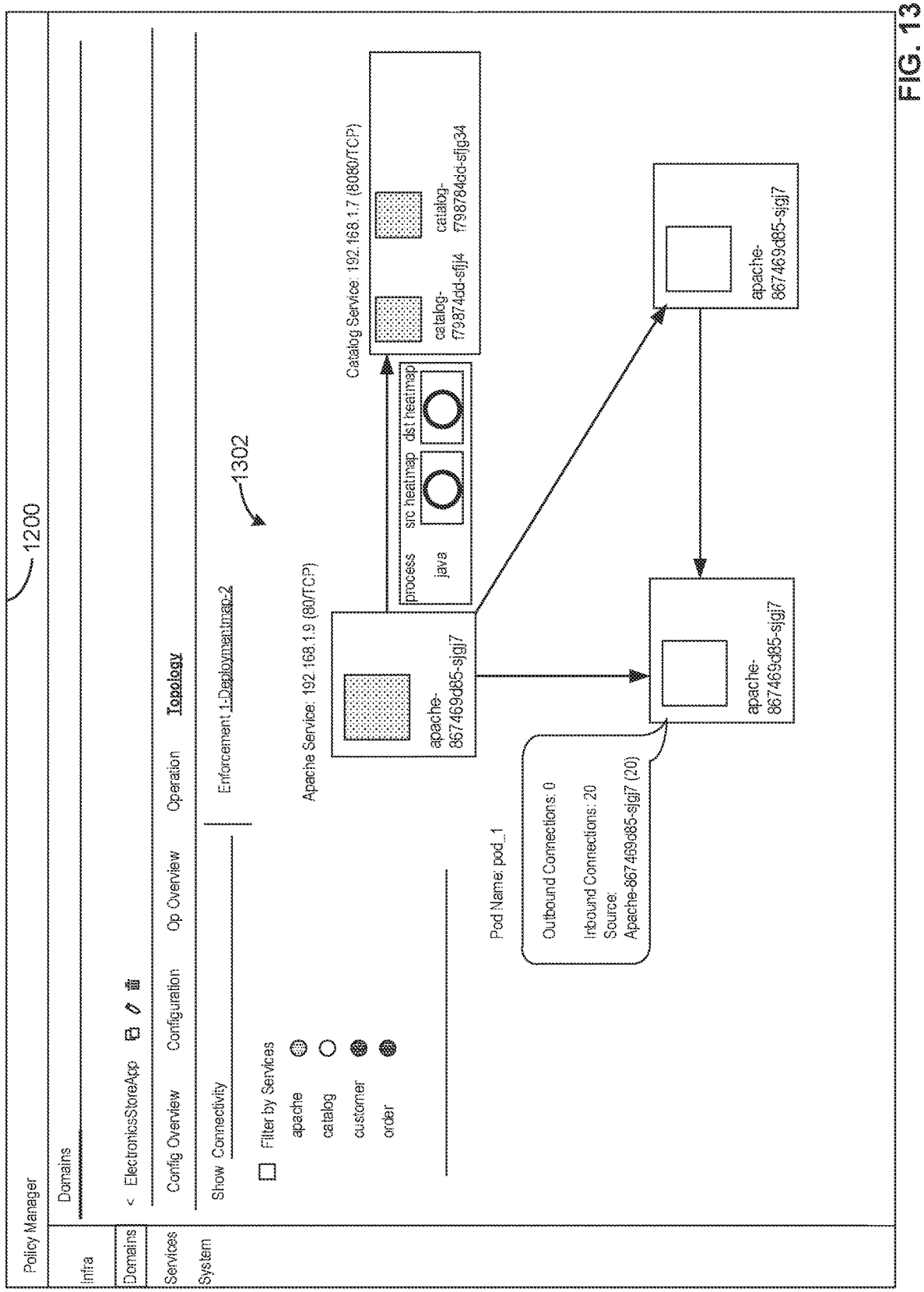
FIG. 13 is an example user interface depicting an example topology of connectivity associated with the example containerized application of FIG. 12 generated by the example container controller of FIG. 1.

FIG. 13 is the user interface 1200 of FIG. 12 depicting an example second UI visualization 1302 corresponding to the application 122 of FIG. 1. The second UI visualization 1302 may correspond to the first visualization 602 of FIG. 6. The second UI visualization 1302 is a network topology graph having a scope at the application layer (e.g., as described in connection with block 1108 of FIG. 11 above).

Figure 14:
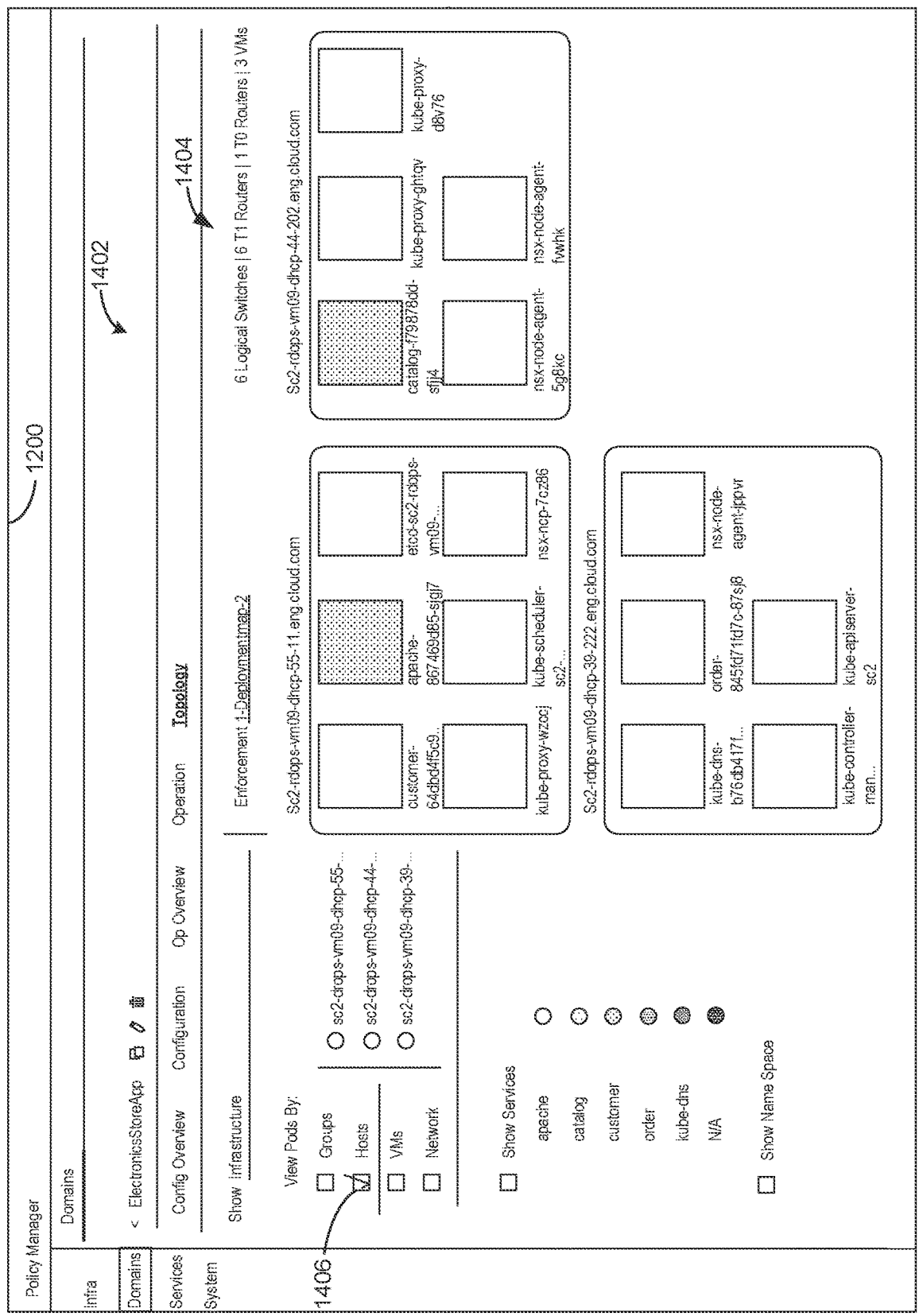
FIG. 14 is an example user interface depicting an example topology of an example infrastructure associated with the example containerized application of FIG. 12 generated by the example container controller of FIG. 1.

FIG. 14 is the user interface 1200 of FIG. 12 depicting an example third UI visualization 1402 corresponding to the application 122 of FIG. 1. The third UI visualization 1402 may correspond to the first visualization 602 of FIG. 6. The third UI visualization 1402 is an infrastructure inventory filtered at the cluster layer of the host 112*a* (e.g., as indicated by 'Hosts' box being checked designated by reference number 1406). In FIG. 14, the third UI visualization 1402 includes example infrastructure topology information 1404 corresponding to 6 logical switches, 6 T1 Routers, 1 T0 Router, and 3 VMs associated with the host 112*a* of FIG. 1.

Figure 15:
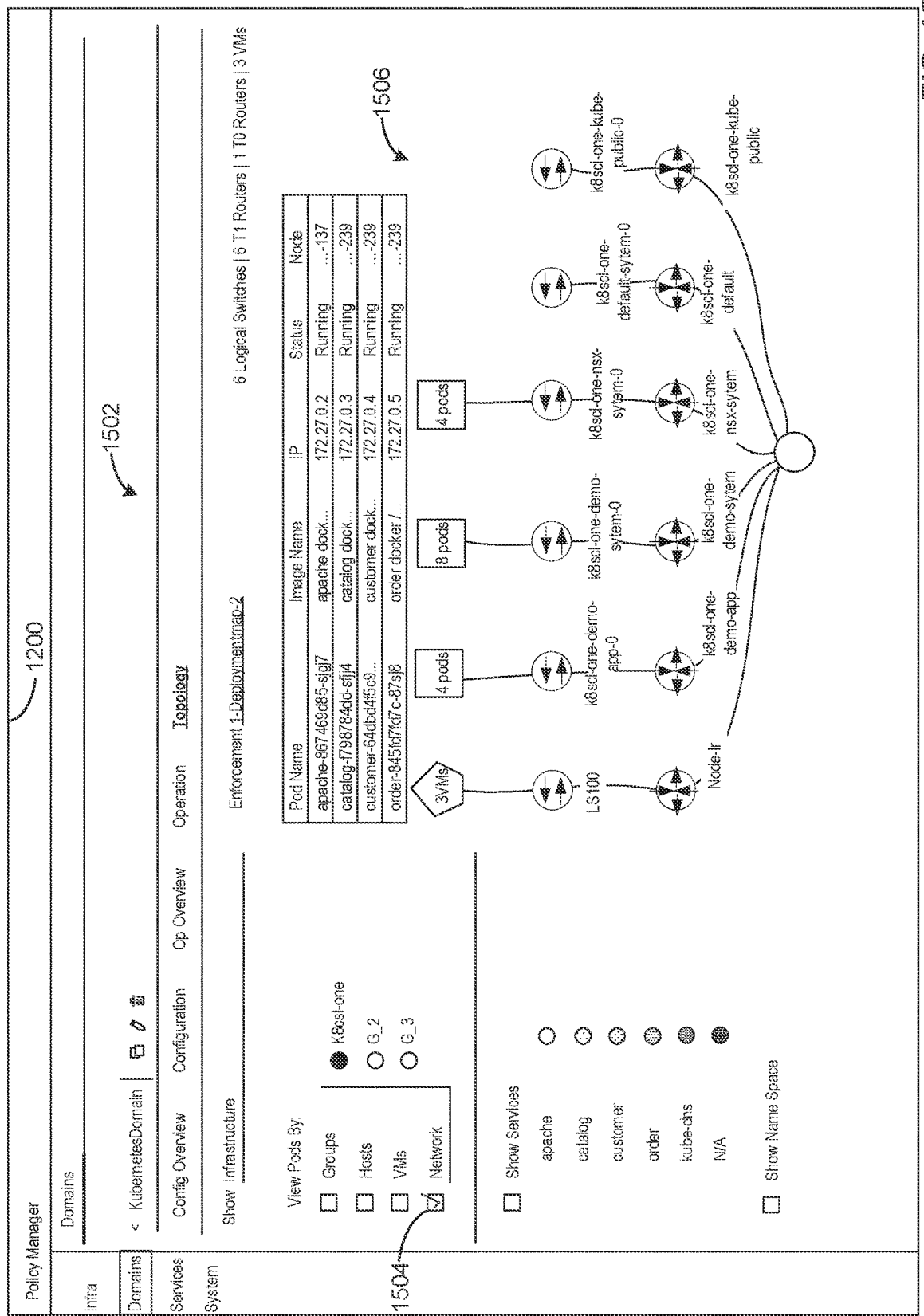
FIG. 15 is an example user interface depicting an example topology of an example network associated with the example containerized application of FIG. 12 generated by the example container controller of FIG. 1.

FIG. 15 is the user interface 1200 of FIG. 12 depicting an example fourth UI visualization 1502 corresponding to the application 122 of FIG. 1. The fourth UI visualization 1502 may correspond to the first visualization 602 of FIG. 6. The fourth UI visualization 1502 is an infrastructure inventory filtered at the cluster layer of the virtual environment 106*a* (e.g., as indicated by 'Network' box being checked designated by reference number 1504). In FIG. 15, the fourth UI visualization 1502 includes example topology information 1506. In FIG. 15, the topology information 1506 includes infrastructure topology information corresponding to 6 logical switches, 6 T1 Routers, 1 T0 Router, and 3 VMs associated with the virtual environment 106 of FIG. 1. In FIG. 15, the topology information 1506 includes network topology information corresponding to a topology of how the 6 logical switches, 6 T1 Routers, 1 T0 Router, and 3 VMs associated with the virtual environment 106 of FIG. 1 are connected.

Figure 16:
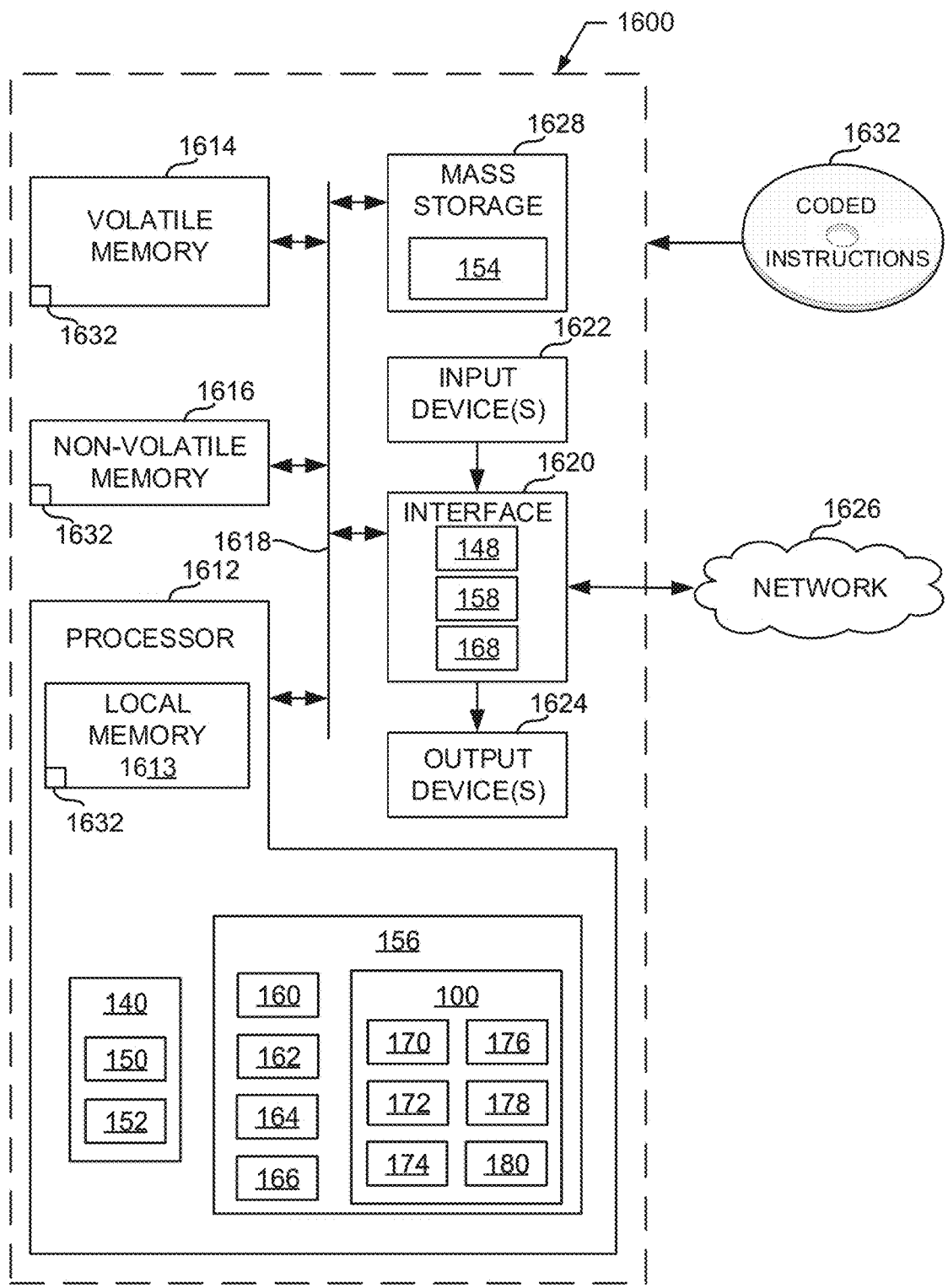
FIG. 16 is a block diagram of an example processing platform structured to execute the example machine readable instructions of FIGS. 7-11 to implement the example container controller of FIG. 1.

FIG. 16 is a block diagram of an example processor platform 1600 structured to execute the instructions of FIGS. 7-11 to implement the container controller 100, and/or, more generally, the network policy appliance 134 of FIG. 1. The processor platform 1600 can be, for example, a server, a personal computer, a workstation, a self-learning machine (e.g., a neural network), or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1612 implements the example container controller 100, the example data collection server 140, the example data processor 150, the example context correlator 152, the example network policy controller 156, the example core policy infrastructure 160, the example VNP stack 162, the example DFW 164, and the example load balancer 166, the example container intent filter 170, the example container intent handler 172, the example container data manager 174, the example container repository manager 176, the example container application manager 178, and the example network topology builder 180 of FIG. 1.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface. In this example, the interface circuit 1620 implements the example server interface 148, the example REST API 158, and the example network controller API gateway 168 of FIG. 1. Alternatively, the processor 1612 may implement one or more of the example server interface 148, the example REST API 158, and/or the example network controller API gateway 168.

In the illustrated example, one or more input devices 1622 are connected to the interface circuit 1620. The input device(s) 1622 permit(s) a user to enter data and/or commands into the processor 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1620 of the illustrated example, thus, typically includes a graphics driver card, a graphics driver chip, and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives. In this example, the one or more mass storage devices 1628 implement the example database 154 of FIG. 1.

The machine executable instructions 1632 of FIGS. 7-11 may be stored in the mass storage device 1628, in the volatile memory 1614, in the non-volatile memory 1616, and/or on a removable non-transitory computer readable storage medium such as a CD or DVD.

From the foregoing, it will be appreciated that example systems, methods, apparatus, and articles of manufacture have been disclosed that improve containerized application visibility for virtualized computing environments. Disclosed systems, methods, apparatus, and articles of manufacture add a new container virtualization layer into the existing IT stack to add new virtual resource management controller objects to provide a comprehensive visualization result of the virtual environment. The new virtual resource management controller objects decrease difficulty for application troubleshooting by identifying topology information at various layers of the virtual environment. Advantageously, the new container virtualization layer may be used to reduce and/or otherwise eliminate downtime when scaling up a containerized application. Disclosed systems, methods, apparatus, and articles of manufacture improve the efficiency of using a computing device by identifying bottlenecks and/or inefficiencies with an existing deployment of a containerized application and trigger remediation actions to resolve the bottlenecks or inefficiencies. Disclosed methods, apparatus, and articles of manufacture are accordingly directed to one or more improvement(s) in the functioning of a computer.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to generate a visualization of a containerized application in a virtual environment, the apparatus comprising:
   circuitry to build an inventory of the containerized application, the containerized application including a first virtual machine and a second virtual machine, the first virtual machine to host a first virtual machine agent and a first container, the second virtual machine to host a second virtual machine agent and a second container;
   a data collection server to:
      obtain, with the first virtual machine agent, a first network traffic event in response to the first container sending a message to the second container;
      obtain, with the second virtual machine agent, a second network traffic event in response to the second container obtaining the message, network topology information associated with the containerized application to be generated based on at least one of the inventory or a comparison of the first network traffic event and the second network traffic event; and
   the circuitry to:
      generate a network topology for the containerized application based on the network topology information;
      build the visualization based on the network topology, the visualization including the inventory and the network topology information; and
      launch a user interface to display the visualization to execute one or more computing tasks.

2. The apparatus of claim 1, wherein the circuitry is to build the inventory by:
   filtering an application programming interface (API) call to determine whether the API call includes a request corresponding to at least one of the first container or the second container;
   in response to determining that the request corresponds to the at least one of the first container or the second container, extracting metadata from the request;
   determining a type of virtual network resource associated with the request based on the metadata;
   in response to determining that the type of virtual network resource corresponds to a logical port, identifying the first container or the second container in communication with the logical port; and
   identifying the first virtual machine or the second virtual machine hosting the identified container.

3. The apparatus of claim 1, wherein the inventory includes at least one of the first container, the second container, the first virtual machine, the second virtual machine, one or more logical switches, or one or more logical routers.

4. The apparatus of claim 1, wherein the first network traffic event and the second network traffic event include one or more tuples, the one or more tuples including at least one of a source Internet Protocol (IP) address, a destination IP address, a source port number, a destination port number, or a type of communication protocol.

5. The apparatus of claim 1, wherein the data collection server is to:
compare first tuples included in the first network traffic event to second tuples included in the second network traffic event; and
determine that the first container is in communication with the second container based on a match of the first tuples and the second tuples.

6. The apparatus of claim 1, wherein the data collection server is to generate the network topology information based on a container traffic message, the container traffic message to be generated by a network agent included in a hypervisor on a host in communication with the first virtual machine, the network agent to generate the container traffic message by:
determining whether the first network traffic event invokes a distributed firewall rule;
in response to determining that the first network traffic event invokes the distributed firewall rule, obtaining network resource information associated with one or more virtual network resources in communication with at least one of the first container or the second container; and
generating the container traffic message including the network resource information.

7. The apparatus of claim 1, further including a container intent handler to:
extract a discovery scope from a request;
determine an intent of the discovery scope; and
in response to determining that the intent corresponds to identifying a container cluster, a container namespace, or a set of user-defined groups, determine whether the discovery scope is valid based on a quantity of containers associated with at least one of the first virtual machine or the second virtual machine.

8. A non-transitory computer readable storage medium comprising instructions which, when executed, cause one or more processors to at least:
build an inventory of a containerized application, the containerized application including a first virtual machine and a second virtual machine, the first virtual machine to host a first virtual machine agent and a first container, the second virtual machine to host a second virtual machine agent and a second container;
obtain a first network traffic event in response to the first container sending a message to the second container;
obtain a second network traffic event in response to the second container obtaining the message;
generate network topology information associated with the containerized application based on at least one of the inventory or a comparison of the first network traffic event and the second network traffic event;
generate a network topology for the containerized application based on the network topology information;
build a visualization based on the network topology, the visualization including the inventory and the network topology information; and
launch a user interface to display the visualization to execute one or more computing tasks.

9. The non-transitory computer readable storage medium of claim 8, wherein the instructions, when executed, cause the one or more processors to build the inventory by:
filtering an application programming interface (API) call to determine whether the API call includes a request corresponding to at least one of the first container or the second container;
in response to determining that the request corresponds to the at least one of the first container or the second container, extracting metadata from the request;
determining a type of virtual network resource associated with the request based on the metadata;
in response to determining that the type of virtual network resource corresponds to a logical port, identifying the first container or the second container in communication with the logical port; and
identifying the first virtual machine or the second virtual machine hosting the identified container.

10. The non-transitory computer readable storage medium of claim 8, wherein the inventory includes at least one of the first container, the second container, the first virtual machine, the second virtual machine, one or more logical switches, or one or more logical routers.

11. The non-transitory computer readable storage medium of claim 8, wherein the first network traffic event and the second network traffic event include one or more tuples, the one or more tuples including at least one of a source Internet Protocol (IP) address, a destination IP address, a source port number, a destination port number, or a type of communication protocol.

12. The non-transitory computer readable storage medium of claim 8, wherein the instructions, when executed, cause the one or more processors to:
compare first tuples included in the first network traffic event to second tuples included in the second network traffic event; and
determine that the first container is in communication with the second container based on a match of the first tuples and the second tuples.

13. The non-transitory computer readable storage medium of claim 8, wherein the instructions, when executed, cause the one or more processors to:
determine whether the first network traffic event invokes a distributed firewall rule;
in response to determining that the first network traffic event invokes the distributed firewall rule, obtain network resource information associated with one or more virtual network resources in communication with at least one of the first container or the second container;
generate a container traffic message including the network resource information; and
generate the network topology information based on the network resource information.

14. The non-transitory computer readable storage medium of claim 8, wherein the instructions, when executed, cause the one or more processors to:
extract a discovery scope from a request;
determine an intent of the discovery scope; and
in response to determining that the intent corresponds to identifying a container cluster, a container namespace, or a set of user-defined groups, determine whether the discovery scope is valid based on a quantity of containers associated with at least one of the first virtual machine or the second virtual machine.

15. A method to generate a visualization of a containerized application in a virtual environment, the method comprising:
- building an inventory of the containerized application, the containerized application including a first virtual machine and a second virtual machine, the first virtual machine hosting a first virtual machine agent and a first container, the second virtual machine to host a second virtual machine agent and a second container;
- obtaining a first network traffic event in response to the first container sending a message to the second container;
- obtaining a second network traffic event in response to the second container obtaining the message;
- generating network topology information associated with the containerized application based on at least one of the inventory or a comparison of the first network traffic event and the second network traffic event;
- generating a network topology for the containerized application based on the network topology information;
- building the visualization based on the network topology, the visualization including the inventory and the network topology information; and
- launching a user interface to display the visualization to execute one or more computing tasks.

16. The method of claim 15, wherein building the inventory includes:
- filtering an application programming interface (API) call to determine whether the API call includes a request corresponding to at least one of the first container or the second container;
- in response to determining that the request corresponds to the at least one of the first container or the second container, extracting metadata from the request;
- determining a type of virtual network resource associated with the request based on the metadata;
- in response to determining that the type of virtual network resource corresponds to a logical port, identifying the first container or the second container in communication with the logical port; and
- identifying the first virtual machine or the second virtual machine hosting the identified container.

17. The method of claim 15, wherein the inventory includes at least one of the first container, the second container, the first virtual machine, the second virtual machine, one or more logical switches, or one or more logical routers.

18. The method of claim 15, wherein the first network traffic event and the second network traffic event include one or more tuples, the one or more tuples including at least one of a source Internet Protocol (IP) address, a destination IP address, a source port number, a destination port number, or a type of communication protocol.

19. The method of claim 15, wherein the comparing of the first network traffic event and the second network traffic event includes comparing first tuples included in the first network traffic event to second tuples included in the second network traffic event, and determining that the first container is in communication with the second container based on the first tuples matching the second tuples.

20. The method of claim 15, further including:
- determining whether the first network traffic event invokes a distributed firewall rule;
- in response to determining that the first network traffic event invokes the distributed firewall rule, obtaining network resource information associated with one or more virtual network resources in communication with at least one of the first container or the second container;
- generating a container traffic message including the network resource information; and
- generating the network topology information based on the network resource information.

21. The method of claim 15, further including:
extracting a discovery scope from a request;
determining an intent of the discovery scope; and
in response to determining that the intent corresponds to identifying a container cluster, a container namespace, or a set of user-defined groups, determining whether the discovery scope is valid based on a quantity of containers associated with at least one of the first virtual machine or the second virtual machine.

\* \* \* \* \*